United States Patent [19]

Stewart et al.

[11] Patent Number: 5,535,371
[45] Date of Patent: Jul. 9, 1996

[54] PORTABLE COMPUTER WITH AUTOMATIC ADAPTION TO DIFFERENT DEVICE TYPES ON A STANDARD PORT

[75] Inventors: Gregory N. Stewart; Anthony L. Overfield, both of Austin, Tex.

[73] Assignee: Dell USA, L.P., Austin, Tex.

[21] Appl. No.: 264,226

[22] Filed: Jun. 22, 1994

Related U.S. Application Data

[63] Continuation of Ser. No. 831,217, Feb. 7, 1992, abandoned.

[51] Int. Cl.⁶ .................................................... G06F 13/00
[52] U.S. Cl. ............................................ 395/500; 395/280
[58] Field of Search ................................ 395/275, 325, 395/500

[56] References Cited

U.S. PATENT DOCUMENTS

| | | | |
|---|---|---|---|
| 4,281,392 | 7/1981 | Grants et al. | 395/425 |
| 4,907,163 | 3/1990 | Cook | 364/474.15 |
| 5,005,151 | 4/1991 | Kurkowski | 395/325 |
| 5,038,299 | 8/1991 | Maeda | 395/275 |
| 5,038,320 | 8/1991 | Heath et al. | 395/275 |
| 5,146,565 | 9/1992 | Blanck et al. | 395/275 |
| 5,163,145 | 11/1992 | Parks | 395/500 |
| 5,165,022 | 11/1992 | Erhard et al. | 395/275 |
| 5,233,350 | 8/1993 | Khim | 341/144 |
| 5,265,238 | 11/1993 | Canova, Jr. et al. | 395/500 |
| 5,300,874 | 4/1994 | Shimamoto et al. | 320/15 |
| 5,335,338 | 8/1994 | Proesel | 395/500 |

*Primary Examiner*—Parshotam S. Lall
*Assistant Examiner*—Viet Vu
*Attorney, Agent, or Firm*—Robert Groover; Jeff Hood; James Huffman

[57] ABSTRACT

A portable computer system wherein the printer port can be used, at the user's option, not only for connection to a printer, but also for connection to an external floppy disk drive. If the BIOS determines that there is an external floppy drive attached, the BIOS disables the normal operation of the parallel port in order to allow the external floppy to operate.

17 Claims, 32 Drawing Sheets

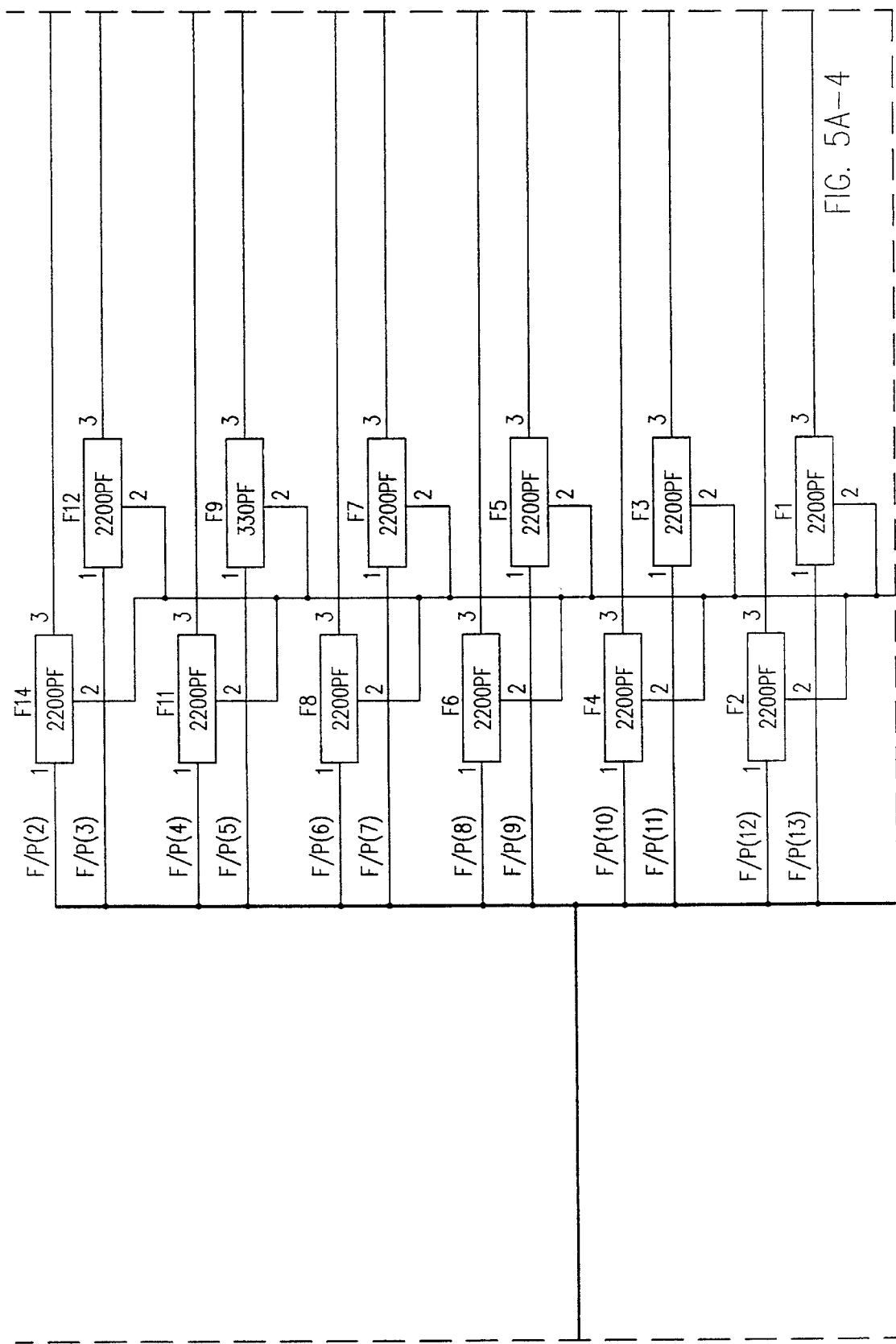

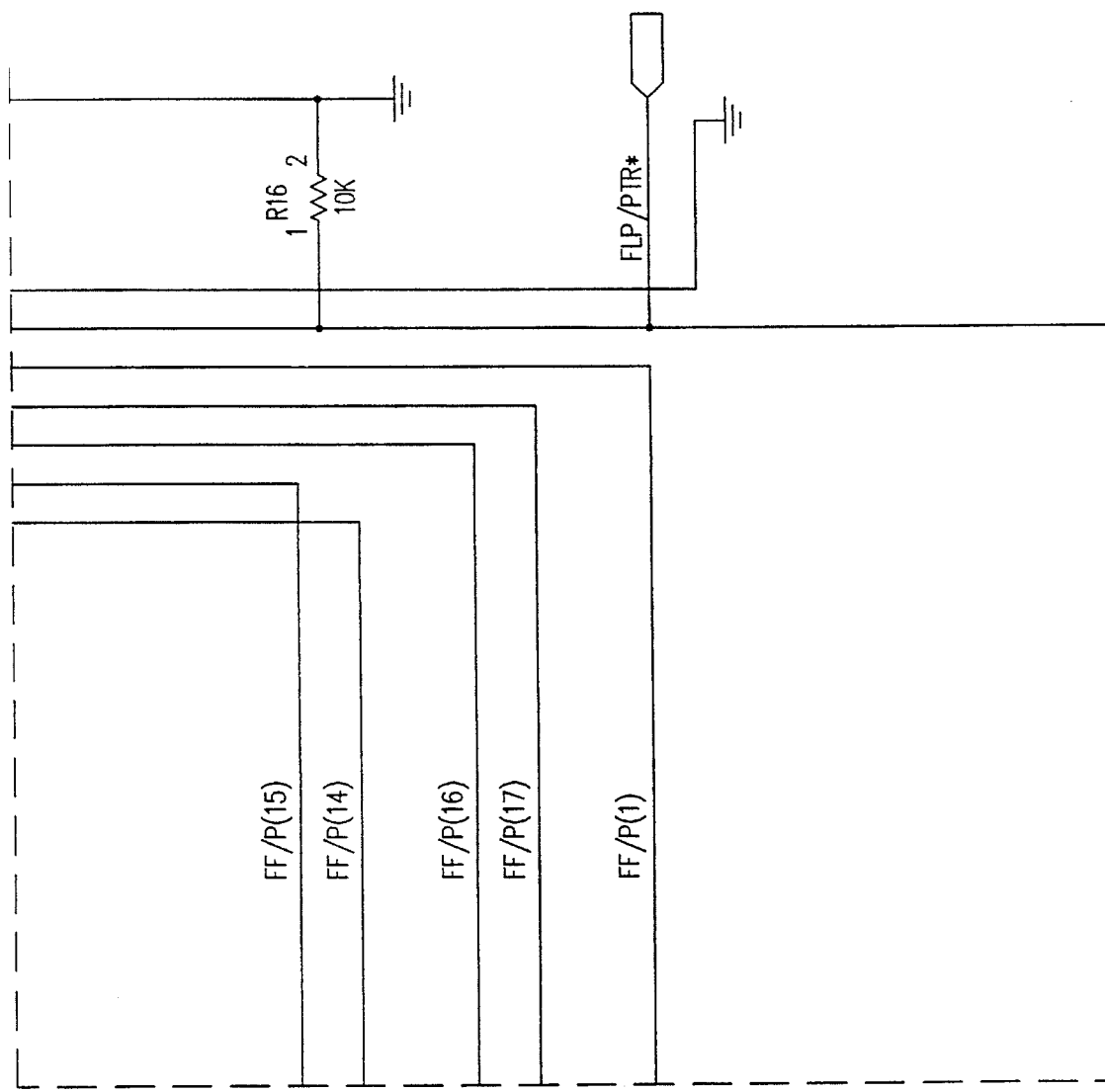

FIGURE LEGEND

| 5B-1 | 5B-2 | 5B-3 | 5B-4 |
|---|---|---|---|
| | | | 5B-5 |

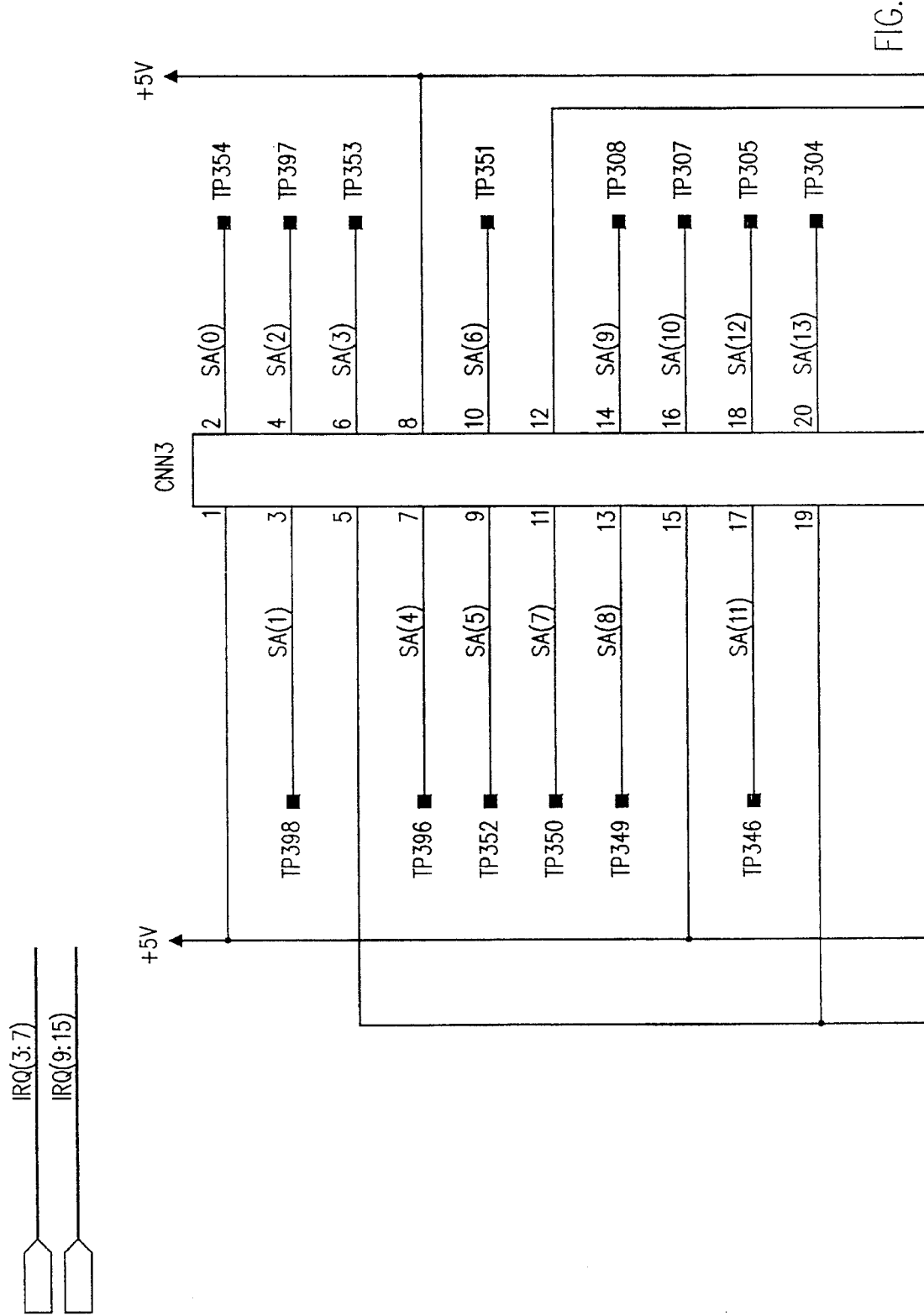

PORTABLE COMPUTER WITH AUTOMATIC ADAPTION TO DIFFERENT DEVICE TYPES ON A STANDARD PORT

This is a continuation of application Ser. No. 07/831,217 filed on Feb. 7, 1992, abandoned.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to personal computers, and to methods for using them.

The innovations disclosed in the present application provide computer systems (especially very small portable personal computers) which have advantageous new capabilities for flexible reconfiguration, by connecting and reconnecting peripherals to a limited number of hardware connectors. To better explain the significance and advantages of these innovations, the following paragraphs will review some technological context. This technological context is not necessarily prior art, but is intended to help in pointing out the disclosed inventions.

Laptop and Smaller Computers

Portable personal computers were introduced in the early 1980s, and proved to be very useful and popular. As this market has developed, it has become increasingly clear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. In about 1990, another smaller generation of portable computers ("notebook" computers) began to appear, and further generations are now starting to appear or being discussed. This continuing shrinkage of form factors will only exacerbate the difficulty of the above tradeoffs.

Some Difficulties of Small Size

To meet the weight, volume, and power budgets of small portable computers, much effort has been made to re-engineer familiar components, within the limits of acceptable compromise with user comfort and convenience, to attain the needed portability. For example, almost no laptop or notebook computers have had more than two disk drives (typically one floppy drive and one hard drive); the keyboards are much smaller than would be optimal for touch typists; and the displays are much smaller than on common desktop models.

Where such compromises are needed to attain the overriding goal of portability, users readily accept them. However, if these compromises can be avoided some of the time, it is highly desirable to do so. Thus, for example, many users will "dock" their laptop or notebook computers, when on their desktops, to better peripherals than could be carried with the portable computer.

Portable computers are inherently more susceptible than desktop computers to accident, loss, and theft. Thus, if critical work is being done on a portable computer, backup is even more of a necessity than with a desktop computer.

Laptops normally have a severely limited set of external ports. This limitation is imposed by several factors: first, each external connector takes up precious square inches of surface area. Second, each external connector is a point of vulnerability to electrostatic-discharge-induced component failure. Third, each external connector is a possible point of entry for dirt and moisture. Fourth, in calculating the worst-case power budget for a system, the possible power required by all connectors must be considered.

Similar problems arise from the need for bus extension. Internal space is not available for expansion cards, as in a normal personal computer; but needs for expansion still exist. Some small computers have brought out key bus lines into an external connector, but of course this is unwieldy. Other small computers have sent signals out over a port to an independently-powered extension bus controller with bus slots which would emulate the computer's internal bus.

Thus, in general, as convenient as small portable computers are, there is some difficulty getting data into and out of them. Usually the only available data routes are through a modem or through the floppy drive.[1] This has been recognized as a problem, and many vendors have offered external drive connections for small portable computers.

[1] Some portable computers have LAN interface cards, but this is an expensive option, and requires a compatible LAN to interface to.

It is believed that one prior portable computer. marketed by Toshiba, included a manual switch for rerouting signals onto the printer port. However, this arrangement did not provide the advantages of the automatic rerouting provided by the inventions disclosed herein.

"Docking" a Portable Computer

Users find it very convenient to "dock" a portable computer on their desktop, to a full-size keyboard and/or display. When a portable computer is used in such a configuration, users will also wish to use many of the peripherals (such as printer, modem, fax machine, tape backup devices, or additional disk drives) which are easily available with a desktop computer.

This problem becomes more urgent as useful amounts of computing power become more available in physically small portable computers.

The Parallel Port in the ISA Architecture

A standard part of the ISA architecture is a parallel port which has a fairly standard definition. The pinout of this port, in the standard DB-25 connector, is shown in (e.g.) Dowden, Inside The EISA Computer (1990), which is hereby incorporated by reference.

The standard use of the parallel port is to output quantities of data to a printer, and get back status signals from the printer. However, it is known that a parallel port can be used for fully bidirectional data transfer. See generally Greenberg, "Adapting the parallel port for bidirectional communication," *Microsoft Systems Journal,* Vol.5 No.5 (Sept. 1990), at 107ff, which is hereby incorporated by reference.

Disk Drives

An essential part of any computer is some sort of mass storage, which is normally a disk drive. At the lowest level, a disk drive is made of several rotating platters, each coated with a magnetic medium like that used in magnetic recording tape. Tape heads (each a solenoid with a gap which is positioned close to the magnetic medium) are moved over the rotating platters, and the magnetic field at the tape head is sensed or driven to read or write data to specific locations on the rotating platter.

When a tape drive reads data, the changing magnetic fields at the head will produce a varying analog voltage. Some significant signal processing activity is normally needed to convert this analog voltage to a correct digital data sequence.

In personal computers, this signal processing is usually performed in a disk drive controller on the motherboard, which is separate from the disk drive and is connected to it by a cable. Thus, this cable carries analog signals and low-level control signals. See generally, e.g., Rosch, "Boost the basics: upgrade your floppy disk drive," *PC Sources,* vol. 2 no. 4 (April 1991), at 230ff, which is hereby incorporated by reference; Martin, "Floppy Disk Controllers Feature Some Important Extras," *Computer Design* vol. 25 no. 15 (Aug. 15, 1986), at 22ff, which is hereby incorporated by reference; Young, "Constant-density recording comes alive with new chips," *Electronic Design,* Nov. 13, 1986, at 141ff, which is hereby incorporated by reference; and Bursky, "Floppy-disk controller puts it all on one chip," Electronic Design, Sep. 4, 1986, at pp. 69ff, which is hereby incorporated by reference.

Some personal computers have had the capability for addition of an external floppy disk drive (or tape drive or hard disk drive). This was normally accomplished by providing external control electronics for the external drive, or by bringing out the analog lines from the drive controller to an external connector.

Layers of Software and Firmware Structure

In order to mediate between application programs and the underlying hardware, several layers of software and firmware structure are used. To better show the context of the invention, these layers will be described below in greater detail.

Startup Software (POST, Bootstrap, etc.)

A computer system normally includes a number of complex hardware components (chips and subsystems). When power is first applied to a computer (or when the user triggers a reset after the system has locked up), the various hardware elements (chips and subsystems) will each have their own internal procedures (reset procedures) to regain a stable and known state. However, at some point (if the hardware is intact), these reset procedures will have ended, and at this point the CPU performs various important overhead tasks[2] under software control. This phase of operation is generally referred to as "POST" (Power-On-Self-Test).

[2]These include, for example, surveying the system configuration, performing sanity checks on system hardware, issuing diagnostic signals (such as sounding beeps through a speaker or turning on LEDs), and permitting the user to branch into an NVRAM configuration program.

After POST, a "bootstrap" program is run, to permit the CPU to begin execution of other software. The bootstrap program launches the CPU on execution of the primary operating system software;[3] the primary operating system can then be used by the user to launch an application program, either manually or automatically.

[3]Depending on how the system has been set up, the boot software may direct program execution into DOS, Unix, OS/2, a DOS variant, or another operating system. This is normally automatic and predetermined, but is manually user-selectable in some systems. However, the choice of operating system is not particularly relevant to the inventions described in the present application.

"Basic Input/Output System" Software (BIOS)

The "basic input/output system" (BIOS) software contains frequently-used routines for interfacing to key peripherals, for interrupt handling, and so forth.[4] For system robustness, the BIOS software itself is normally packaged in nonvolatile memory[5] with other key pieces of overhead software, such as POST,[6] boot, and configuration management routines,[7] as well as a pointer to launch the computer into the operating system software.[8]

[4]Thus, the BIOS software provides some degree of machine-independence. However, in PC-class computers, this independence is not fully exploited by the available commercial software. Many programs bypass the BIOS software, and directly access the underlying hardware addresses or devices. See generally Glass, "The IBM PC BIOS," *Byte,* April 1989, pp. 303ff.
[5]However, in 1991 IBM introduced a PS/2 system in which the BIOS is at least partially stored on disk.
[6]The POST routines provide an extensive check for hardware integrity.
[7]Packaging the BIOS, POST and boot routines in ROM makes a very robust firmware system. Short of hardware damage, it is very difficult for a user to distort the system to the point where it will not start up and run (if the operating system software is present).

However, this system also provides a considerable degree of flexibility. As the operating system starts up (after the POST and boot routines), the user can remap address pointers to revector BIOS calls away from the standard BIOS routines, if desired. (It is also common for users to map out the entire BIOS contents into fast RAM, for greater speed.)

[8]Depending on how the system has been set up, the BIOS software may direct program execution into DOS, Unix, PS/2, a DOS variant, or another operating system. However, the choice of operating system is not particularly relevant to the inventions described in the present application.

For system robustness, the BIOS software is normally packaged in a read-only-memory, together with the POST and boot software. (Thus, the term "BIOS" is often used more broadly, to refer to this whole collection of basic system routines in ROM or EPROM.)

Operating System Software

The application software will normally interface to an operating system (such as DOS, DOS+Windows, OS/2, UNIX of various flavors, or UNIX plus X-windows). The operating system is a background software program[9] which provides an application programming interface (API) for use by the application software. Thus, the programmers writing application software can write their software to fit the API, rather than having to find out and fit the peculiarities of each particular machine.[10]

[9]Some operating systems run continuously, or at least start up at regular intervals, even while an application program is running; other operating systems merely provide capabilities which can be called on by the application software.
[10]See, e.g., Quedens, "Windows virtual machine," *PC Tech Journal* vol.5, no.10 p.90, 92–3, 95, 97, 99–100, 102 (Oct. 1987), which is hereby incorporated by reference.

System Configuration Tables

Some computer systems have previously used a feature table, stored in nonvolatile memory, to describe various characteristics of the machine. The IBM AT BIOS uses such a feature table (stored in battery-backed CMOS memory). This feature table, in expanded form, has also been used in the IBM PS/2 systems and has been utilized in the system BIOS of all IBM AT- and PS/1-compatible personal computers. This table is in the form of a bit map where each bit refers to specific hardware implementations employed by the designers of the machine. A pointer to this table may be obtained through executing a software interrupt. More specifically, executing interrupt 15h with AH=C0h will return a pointer to the table in ES:BX. However, this feature table is restricted to merely listing certain hardware features in the machine, such as the number of DMA controllers, and does not provide an interface to these features. Furthermore, the elements of the list are fixed.

Application Software

From a system designer's point of view, the application software is (subject only to the minimal constraints of the architectural standards) wholly unpredictable. Common applications include spreadsheets, word processors and publishing programs, databases, games, project managers and a wide variety of others; but inevitably users will also run customized applications, and new types of applications.

Many commercial software packages are still shipped only with a 5¼" install diskette.[11] Moreover, many software packages are shipped in compressed form, so that the user is expected to run an install routine from the floppy disk, which is expected to properly decompress his software, select the appropriate modules, and install them on his hard disk. Many of these install utilities expect to be running from the A: drive.

[11] At present, both 5¼" and 3½" floppy disks are commonly used, in various data formats (of 360K, 1.2M, 720K, 1.44M, or 2.88M capacity). The need for 5¼ compatibility may diminish over time, but other portable media data formats will continue to be introduced, so that compatibility issues will continue to arise. Many of the issues facing laptop computer designers and users in 1991 will face the designers and users of pocket or clip-on computers in 1995 or 2005.

Innovative Computer System and Method

The present invention provides a portable computer system with a standard printer port, which can be used, in completely standard fashion, for connection to any standard printer, and with any standard operating system and application software. However, this printer port can also be used, at the user's option, not only for connection to a printer, but also for connection to a non-printer accessory. This is not the normal use of this standard port, but the disclosed innovations permit the computer to automatically detect use of such non-printer accessories on the printer port, and permit the computer to automatically interface to them.

In the presently preferred embodiment, the pins of the parallel port connector are not only connected to the pins of the port controller (as is normal), but are also connected to the lines which run between the disk drive controller and the internal floppy drive. Hardware multiplexing is preferably used to avoid contention between the parallel port control logic and the floppy drive control logic.

Non-Printer Peripherals on the Parallel Port

The present invention provides a portable computer system wherein the printer port can be used, at the user's option, not only for connection to a printer, but also for connection to an external tape backup, or to an external floppy disk drive.

Within the system chassis, two (or more) sets of port interface chips are wired to the port connector. Contention is avoided by hardware multiplexing.

Adaptation for Peripheral Docking

The present application discloses a portable computer system wherein the startup routines in the system software can rapidly accommodate the docking or undocking of the computer from an external peripheral (such as a floppy disk drive). The innovative system, like older systems, contains configuration tables, in nonvolatile memory, which specify many configuration parameters, including disk drive parameters. Whenever the computer is booted tip, the startup software will check the configuration table against the actual configuration. If the external drive has been removed or reconnected since the tables were last updated, they will be found to be inaccurate at the next boot operation. When this occurs, the disclosed system does not update the tables from scratch; instead, it accesses additional nonvolatile storage, and retrieves or saves data which indicates the correct type for the external drive when present. In addition, in the presently preferred embodiment, the disclosed system automatically remaps the logical drive designators when the external drive is present. (In DOS computers, many software packages expect or require installation from the A: drive.) Thus, for example, in a laptop computer which contains a single 3½" floppy disk drive, software can rapidly be installed from an external 5¼" floppy drive. When the laptop is booted after being docked to the external 5¼" floppy drive, the external floppy drive is the A: drive and the internal drive is the B: drive; but when the laptop is booted in a standalone configuration, the internal drive will be the A: drive.

Automatic Configuration Table Update after Reconnection

Normally updates to the AT configuration table must be done manually. The disclosed innovations advantageously circumvent this, by rapidly and automatically updating the configuration tables whenever the external drive is reconnected.

Remapping Logical Drive Designations

The reversal of the logical drive assignments is a further feature which helps to achieve rapid loading of software. As noted above, some software programs demand to be installed from the A: drive, and the disclosed innovative system permits the external drive to be the A: drive whenever it is hooked up.

Preferred Hardware Context

The presently preferred embodiment provides a portable computer system wherein the startup routines in the system software can rapidly accommodate the docking or undocking of the computer from an external peripheral (such as a floppy disk drive). This sample system, like older systems, contains configuration tables, in nonvolatile memory, which specify many configuration parameters, including disk drive parameters. Whenever the computer is booted up, the startup software will check the configuration table against the actual configuration. If the external drive has been removed or reconnected since the tables were last updated, they will be found to be inaccurate at the next boot operation. When this occurs, the disclosed system does not update the tables from scratch; instead, it accesses additional nonvolatile storage, and retrieves or saves data which indicates the correct type for the external drive when present. In addition, in the presently preferred embodiment, the disclosed system automatically remaps the logical drive designators when the external drive is present. (In DOS computers, many software packages expect or require installation from the A: drive.) Thus, for example, in a laptop computer which contains a single 3½" floppy disk drive, software can rapidly be installed from an external 5¼" floppy drive. When the laptop is booted after being docked to the external 5¼" floppy drive, the external floppy drive is the A: drive and the internal drive is the B: drive; but when the laptop is booted in a standalone configuration, the internal drive will be the A: drive.

Automatic Configuration Table Update after Reconnection

Normally updates to the AT configuration table must be done manually. The disclosed innovations advantageously circumvent this, by rapidly and automatically updating the configuration tables whenever the external drive is reconnected.

Remapping Logical Drive Designations

The reversal of the logical drive assignments is a further feature which helps to achieve rapid loading of software. As noted above, some software programs demand to be installed from the A: drive, and the disclosed innovative system permits the external drive to be the A: drive whenever it is hooked up.

Electrical Detection of Non-Printer Use of Printer Port

A standard part of the ISA architecture is a parallel port which has a fairly standard definition. This port is most commonly used for connection of a printer, and hence is often referred to as the "printer port." The pinout of this port, in the standard DB-25 connector, is shown (for example) in Dowden, Inside The EISA Computer (1990), which is hereby incorporated by reference.

The standard use of the parallel port is to output quantities of data to a printer, and get back status signals from the printer. However, it is known that a parallel port can also be used for fully bidirectional data transfer. See, e.g., Greenberg, "Adapting the parallel port for bidirectional communication," *Microsoft Systems Journal* Vol.5 No.5 (Sept. 1990), at 107ff, which is hereby incorporated by reference.

BRIEF DESCRIPTION OF THE DRAWING

The present invention will be described with reference to the accompanying drawings, which show important sample embodiments of the invention and which are incorporated in the specification hereof by reference, wherein:

FIG. 5A is shown on nine sheets labeled 5A-1, 5A-2, 5A-3, 5A-4, 5A-5, 5A-6, 5A-7, 5A-8 and 5A-9 and collectively referenced herein as FIG. 5A. FIG. 5B is shown on five sheets labeled 5B-1, 5B-2, 5B-3, 5B-4, and 5B-5 and collectively referenced herein as FIG. 5B. FIG. 5C is shown on eight sheets labeled 5C-1, 5C-2, 5C-3, 5C-4, 5C-5, 5C-6, 5C-7, and 5C-8 and collectively referenced herein as FIG. 5C.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Overview of Sample Hardware Implementation

The presently preferred embodiment has been implemented on several different computer systems. The primary disclosed embodiment relates to the Dell 320N computer. This is a notebook computer, with an external closed size of about 8.5×11×2 inches.

Figure 4:
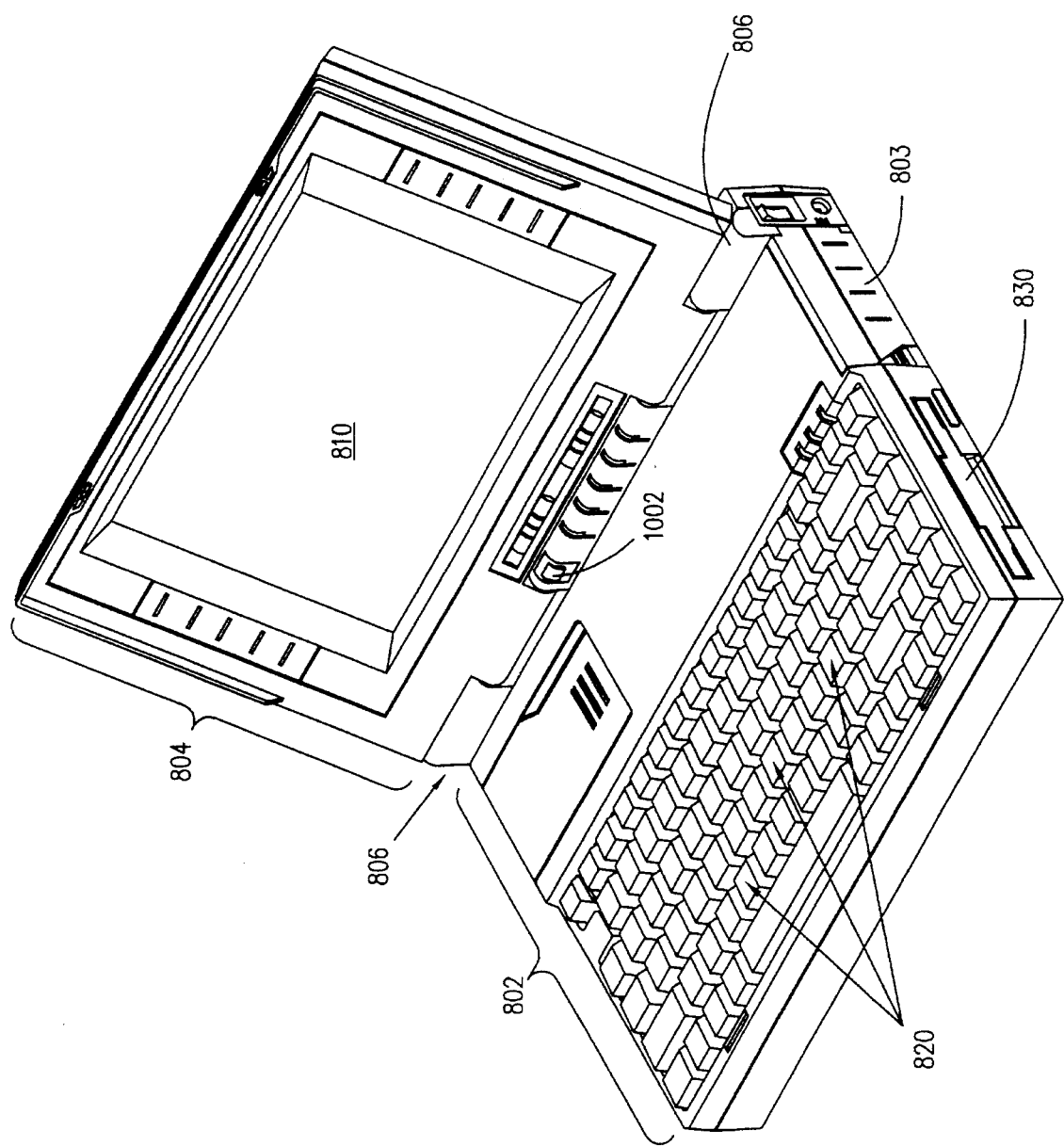
FIG. 4 shows the physical appearance of the notebook computer of the presently preferred embodiment.

FIG. 4 shows a perspective view of the notebook computer 100, of the presently preferred embodiment, in the open position. This computer is a notebook computer, which includes a compact keyboard and screen in a rugged plastic case with a battery power supply. Visible elements include case 802, cover 804, hinges 806, display screen 810, keyboard 820, floppy disk drive 830, and dust cover 803 (which covers the receptacle for the rechargeable battery pack).

This computer, in the presently preferred embodiment, is a Dell 320N™ notebook computer, containing an Intel 386SX processor running at 20 MHz. (Hardware details and options of this computer, in the presently preferred embodiment, are extensively described in readily available Dell product literature, which is hereby incorporated by reference.) However, this model is merely one example of the hardware environments in which the inventions have been demonstrated to work.

FIGS. 3A–3E show the detailed structure of the preferred hardware embodiment.

The presently preferred embodiment has been implemented on several different computer systems. The primary disclosed embodiment relates to the Dell 320N computer. This is a notebook computer, with an external closed size of about 8.5×11×2 inches.

FIG. 4 shows a perspective view of the notebook computer of the presently preferred embodiment in the open position. Visible elements include case 802, cover 804, hinges 806, display screen 810, keyboard 820, floppy disk drive 830, and dust cover 803 (which covers the receptacle for the rechargeable battery pack).

The microprocessor 300 is an Intel 386SX processor running at 20 MHz. (Hardware details and options of this computer, in the presently preferred embodiment, are extensively described in readily available Dell product literature, which is hereby incorporated by reference.) However, this model is merely one example of the hardware environments in which the inventions have been demonstrated to work.

In the presently preferred embodiment, an HT21 chip 310, from Headland Technologies, is used to provide a variety of peripheral support functions to the main microprocessor. These include bus management, memory management, interrupt control, and DMA control. Serial port management and keyboard interface, and other I/O management functions, are provided by a VTI 82C186 combination chip 350. Of course, other implementations of support logic and glue logic can be used if desired, within this well-known architecture.

FIGS. 3A–3E show the detailed structure of the preferred hardware embodiment.

This computer is a notebook computer, which includes a compact keyboard and screen in a rugged plastic case with a battery power supply.

Figure 3A:
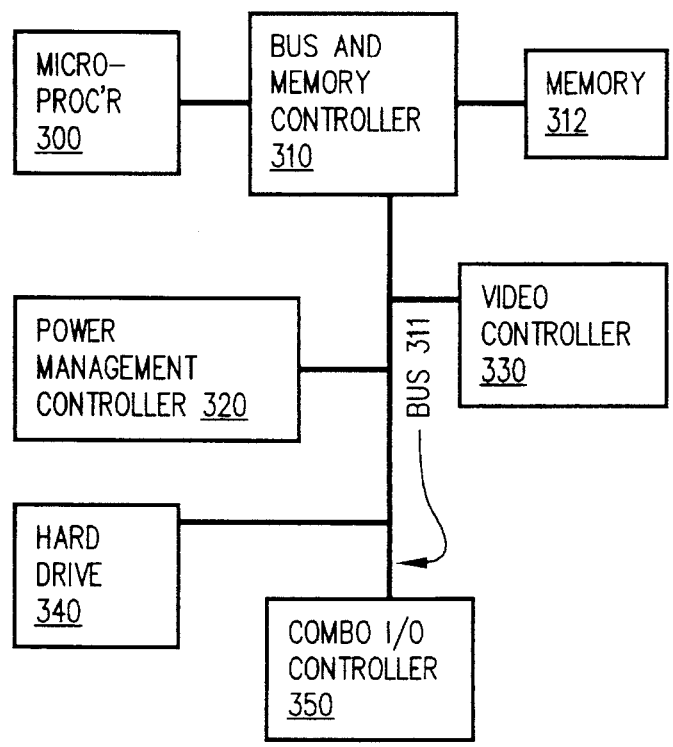
FIGS. 3A–3E show the detailed structure of the preferred hardware embodiment.

FIG. 3A gives an overview of the principal electronic components of hardware architecture.

Microprocessor 300, in the presently preferred embodiment, is a 386SX processor running at a 20 MHz clock rate. This microprocessor accesses bus 311, and memory 312, through controller 310. Bus and memory controller 310, in the presently preferred embodiment, is an HT21 chip from Headland Technologies. This chip provides a variety of peripheral support functions to the main microprocessor, including bus management, memory management, interrupt control, and DMA control.

Bus 311, in the presently preferred embodiment, is an ISA bus. Memory 312, in the presently preferred embodiment, is DRAM, as discussed below.

Figure 3B:
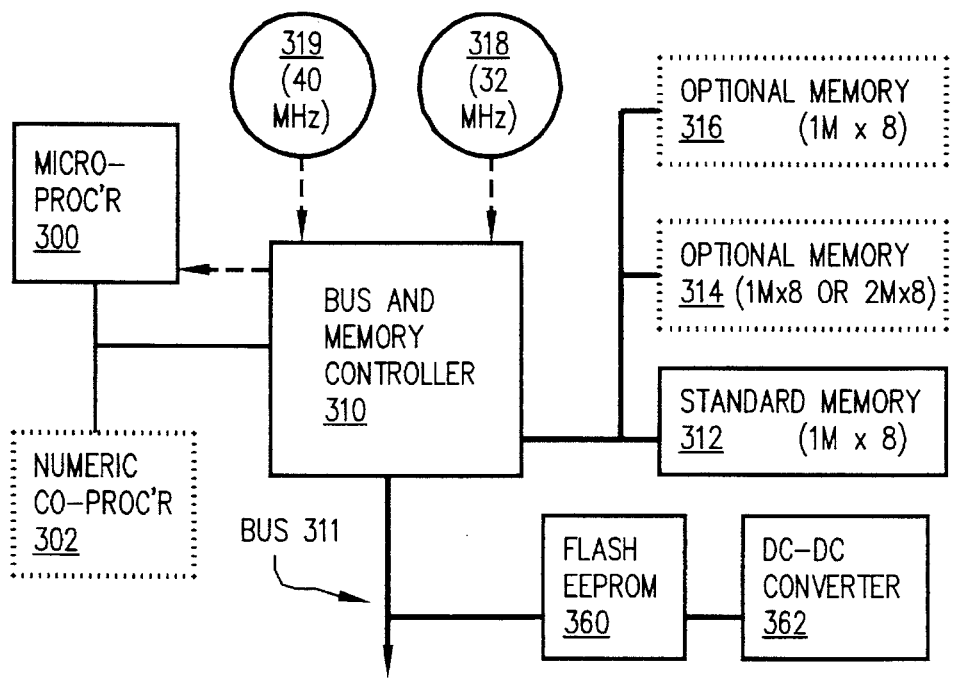
Figure 3C:
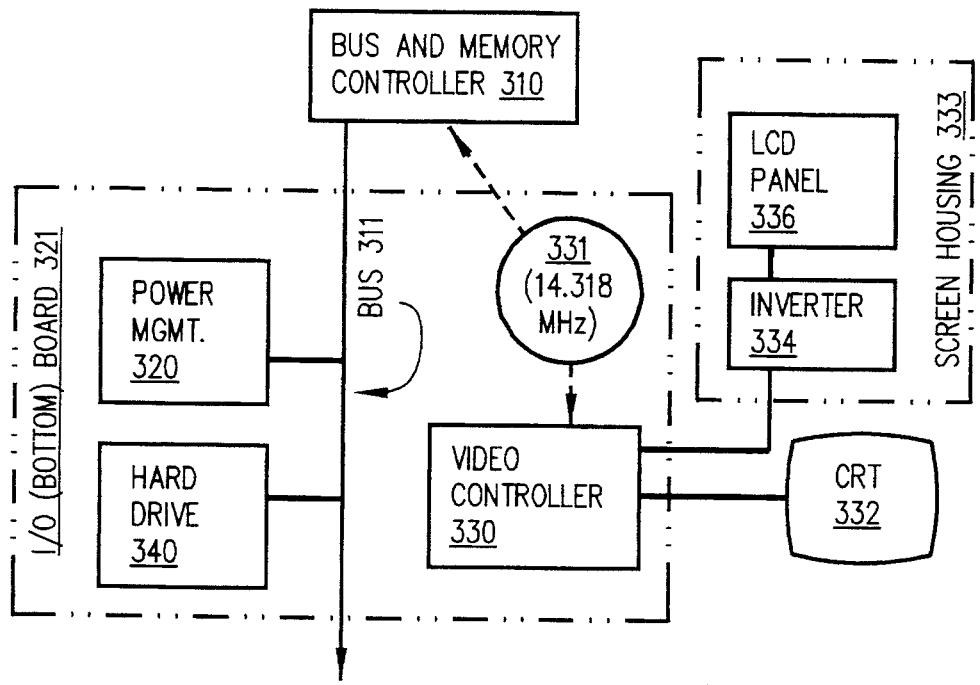

Video controller 330 is, in the presently preferred embodiment, a VGA chip, and is connected to additional components as shown in FIG. 3C below. This is implemented as a WD 90C20 VGA controller chip, in the presently preferred embodiment; but of course other components can optionally be used instead.

Figure 3D:
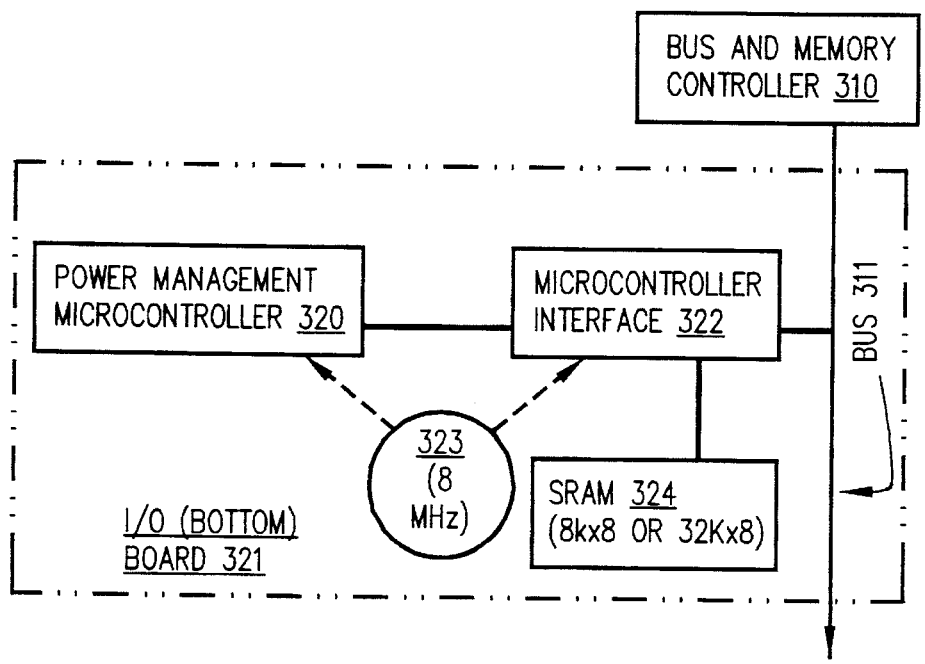

Power Management Controller 320 is a microcontroller, in the presently preferred embodiment, and is connected to additional components as shown in FIG. 3D below.

Hard disk drive 340, in the presently preferred embodiment, is a ruggedized 2½" IDE drive, such as the Conners Peripherals 242 40 MB 2.5" hard disk. (Other sizes are also available.)

Figure 3E:
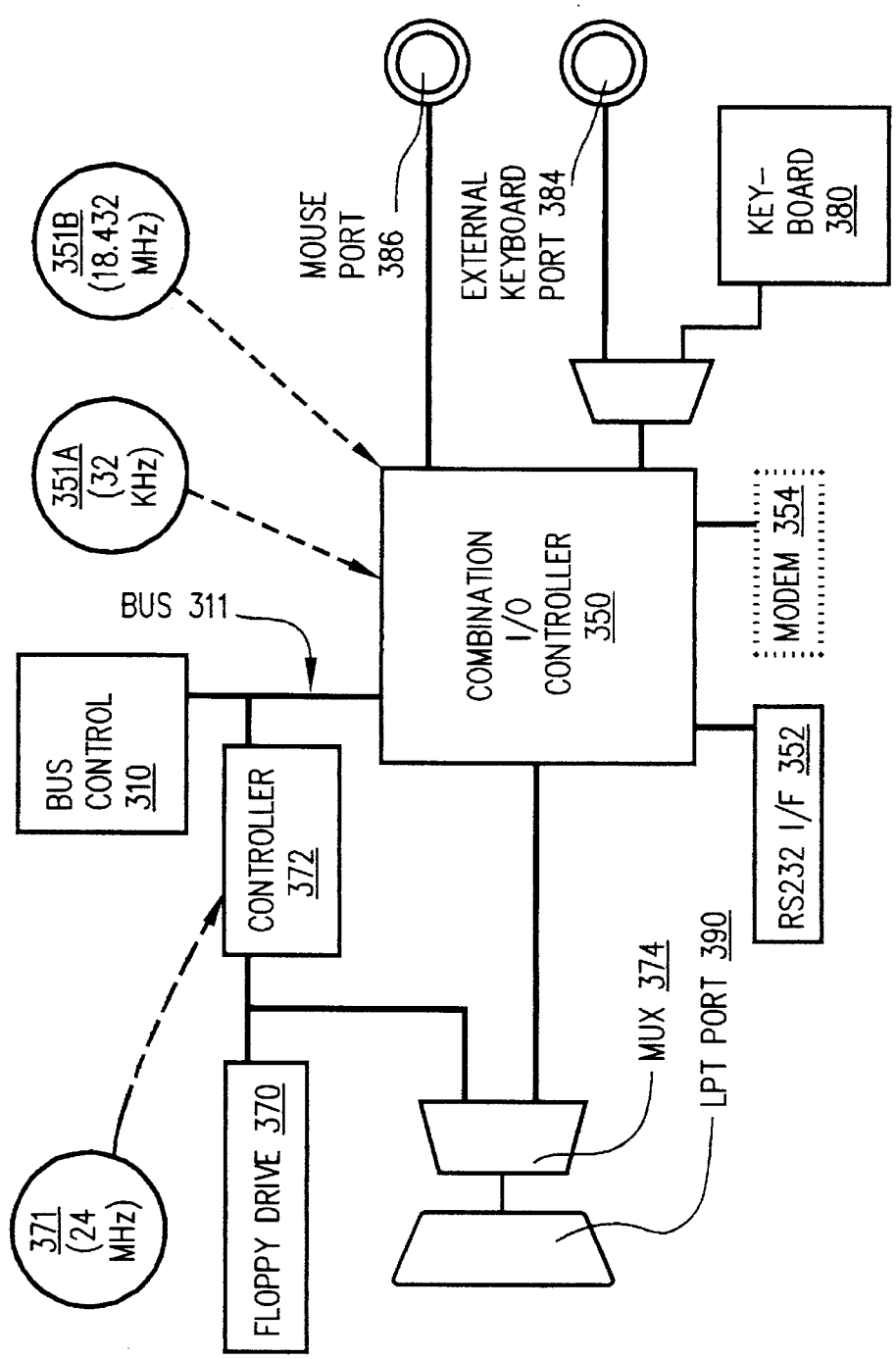

Serial port management and keyboard interface, and other I/O management functions, are provided, in the presently preferred embodiment, by a VTI 82C186 combination chip 350. (Of course, other implementations of support logic and glue logic can be used if desired, within this well-known architecture.) Combination I/O Controller 350 is connected to additional components as shown in FIG. 3E below.

FIG. 3B shows additional details of the connections of microprocessor 300 and bus controller 310. The microprocessor 300 is connected in parallel with a socket for an optional numeric co-processor 302 (e.g. a 387SX chip). Bus controller 310 receives two oscillator inputs. A 40 MHz crystal-controlled oscillator 319 provides a signal which is divided down to provide the clock for microprocessor 300. A 32 MHz crystal-controlled oscillator 318 provides a signal which is divided down to provide the clock for bus 311.

The standard component of memory 312 is one megabyte of DRAMs, 8 bits wide. Sockets are provided for optional expansion memory 314 (1M×8 or 2M×8), and for optional expansion memory 316 (2M×8). Both of these optional expansion memories are connected in parallel with memory 312 (except for slightly different address line connections).

Flash EEPROM 360 provides a rewritable boot memory. (The operation of this memory is described in detail in commonly owned application 707,121, filed May 29, 1991, entitled "Computer System with Restorable Basic Firmware" (DC- 200), which is hereby incorporated by reference.) When the flash memory 360 must be programmed, DC-DC converter 362 generates a 12-Volt programming voltage from the 5-Volt supply.

The hardware system of the presently preferred embodiment uses only three circuit boards for all components other than the power supply. The components shown in FIGS. 3B and 3E are included on a common circuit board. However, FIGS. 3C and 3D show components which are on an I/O (bottom) circuit board 321 or inside the screen housing 333.

FIG. 3C shows additional details of the connections of the video controller 330. A 14.318 MHz crystal-controlled oscillator 331 provides a reference frequency to video controller 330 and to bus controller 310. The video controller provides video output to inverter 334 and LCD display panel 336. (This is a Sharp VGA flat panel display, in the presently preferred embodiment, but of course other displays can be substituted.) A connection is also provided, in the presently preferred embodiment, for an external CRT monitor 332, which, if connected, can also be supplied with video signals from video controller 330.

FIG. 3D shows additional details of the connections of the power management microcontroller 320. In the presently preferred embodiment, this is a National Semiconductor COP888CF series microcontroller, which is connected to receive various inputs for power-monitoring. An ASIC 322 provides interface logic, including sequential logic, for interfacing the microcontroller 320 to the system bus 311. An 8 MHz crystal-controlled oscillator 323 provides a clock signal to microcontroller 320 and interface chip 322. An SRAM 324 (which may be 8K×8 or 32K×8) is also accessed through the interface chip 322. This provides local memory which the microcontroller 320 can use. U.S. patent application No. 07/655,889, filed Feb. 14, 1992 and entitled "Portable Computer with BIOS-independent Power Management" (DC-172), provides extensive detail concerning power management microcontroller 320 and ASIC 322. This application is hereby incorporated by reference.

FIG. 3E shows additional details of the connections of the combination I/O controller 350. This chip receives clock inputs from an 18.432 MHz crystal-controlled oscillator 351B, and from a 32 KHz crystal-controlled oscillator 351A. This chip, in the presently preferred embodiment, is a VTI 106; but of course a variety of other combination I/O management chips are available from Headland, Chips &

Technologies, and other vendors, and other such chips can optionally be designed in.

I/O controller 350 is connected to receive input from mouse port 386.

I/O controller 350 is also connected to receive input from built-in keyboard 380, or from an external keyboard when one is plugged into external keyboard port 384.

I/O controller 350 is also connected to communicate with an internal modem 354, if one is installed.

I/O controller 350 is also connected to communicate, through RS232 interface 352, with a serial port connector (not shown).

I/O controller 350 is also connected to communicate, through multiplexer 374, with printer (parallel) port 390. Note that multiplexer 374 also, in the presently preferred embodiment, permits the floppy disk controller 372 to send and receive floppy disk interface signals over the parallel port connector 390. This novel feature permits an external floppy drive to be connected to the printer port connector 390.

Floppy disk controller 372 interfaces to bus 311, and receives a clock signal from 24 MHz oscillator 371. Floppy disk controller 372 is a standard controller for a 3½" floppy disk drive 370, which, in the presently preferred embodiment, is an Epson 3.5" floppy disk drive unit.

The computer 100 also contains a conventional power supply circuitry (not shown), with connections for banks of rechargeable batteries. (Additional details of the power supply circuitry and battery connections are shown in application DC- 172, referenced above, and hereby again incorporated by reference.)

Signal Assignments at the Printer Port

Figure 1A:
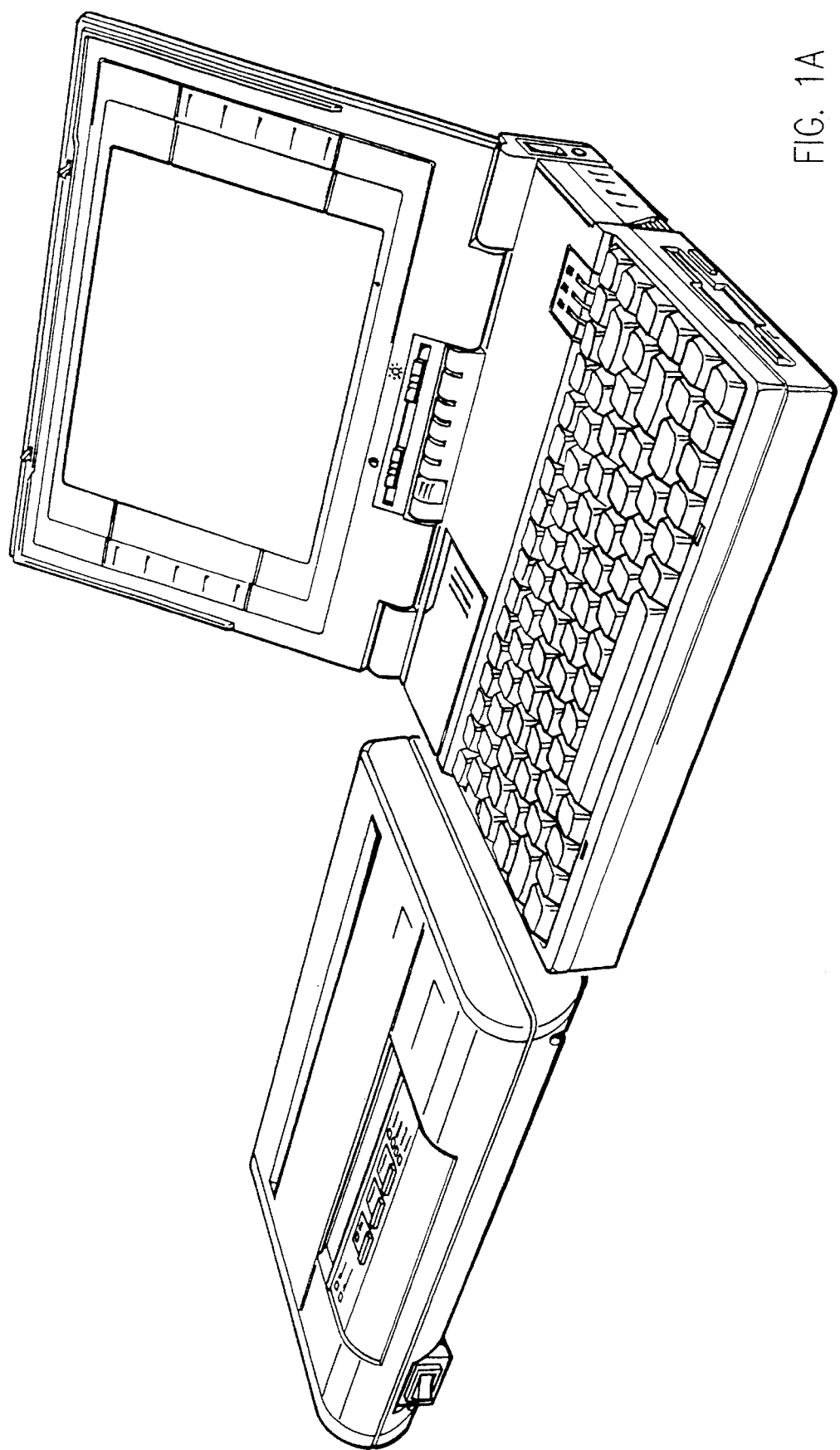
FIG. 1A shows the notebook computer of the presently preferred embodiment docked to a printer.
Figure 2A:
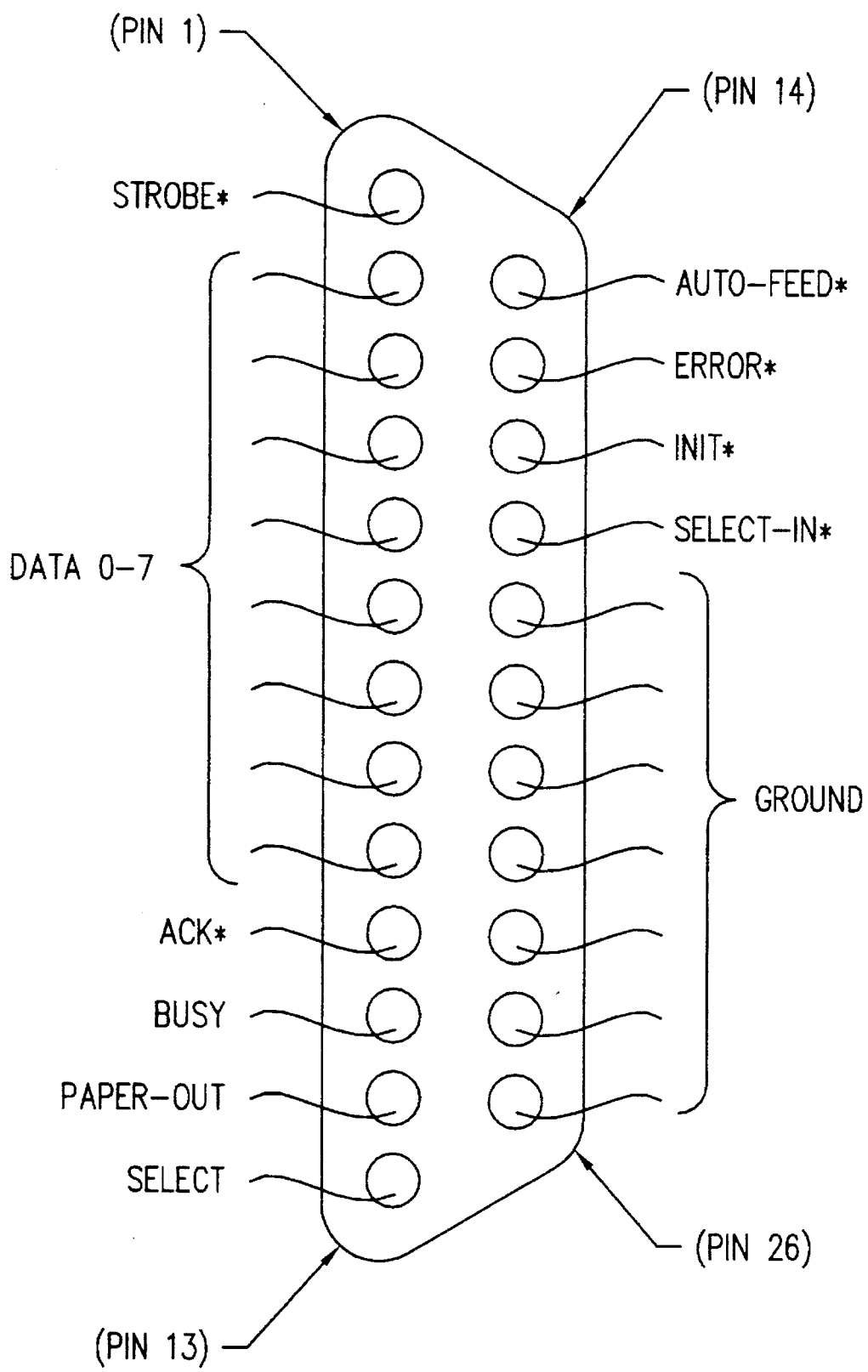
FIG. 2A shows the pinout of the standard DB-25 parallel port connector in the standard ISA architecture. These pin assignments are valid, in the presently preferred embodiment, when the DB-25 parallel port connector is being used for printer interface according to the standard ISA architecture (as in FIG. 1A), rather than for interface to an external floppy drive (as in FIG. 1B) or tape drive (as in FIG. 1C).

When the laptop computer 100 is used with an external printer, it is connected and operated just like any other ISA (or EISA) standard personal computer. FIG. 1A schematically shows a sample embodiment, in which the computer 100 is docked to a lightweight portable printer 110, which is a Diconix in the presently preferred embodiment; but of course any other standard Centronics-interface printer can be used instead. FIG. 2A shows the (standard) signal assignments which are used in this case.

Figure 2B:
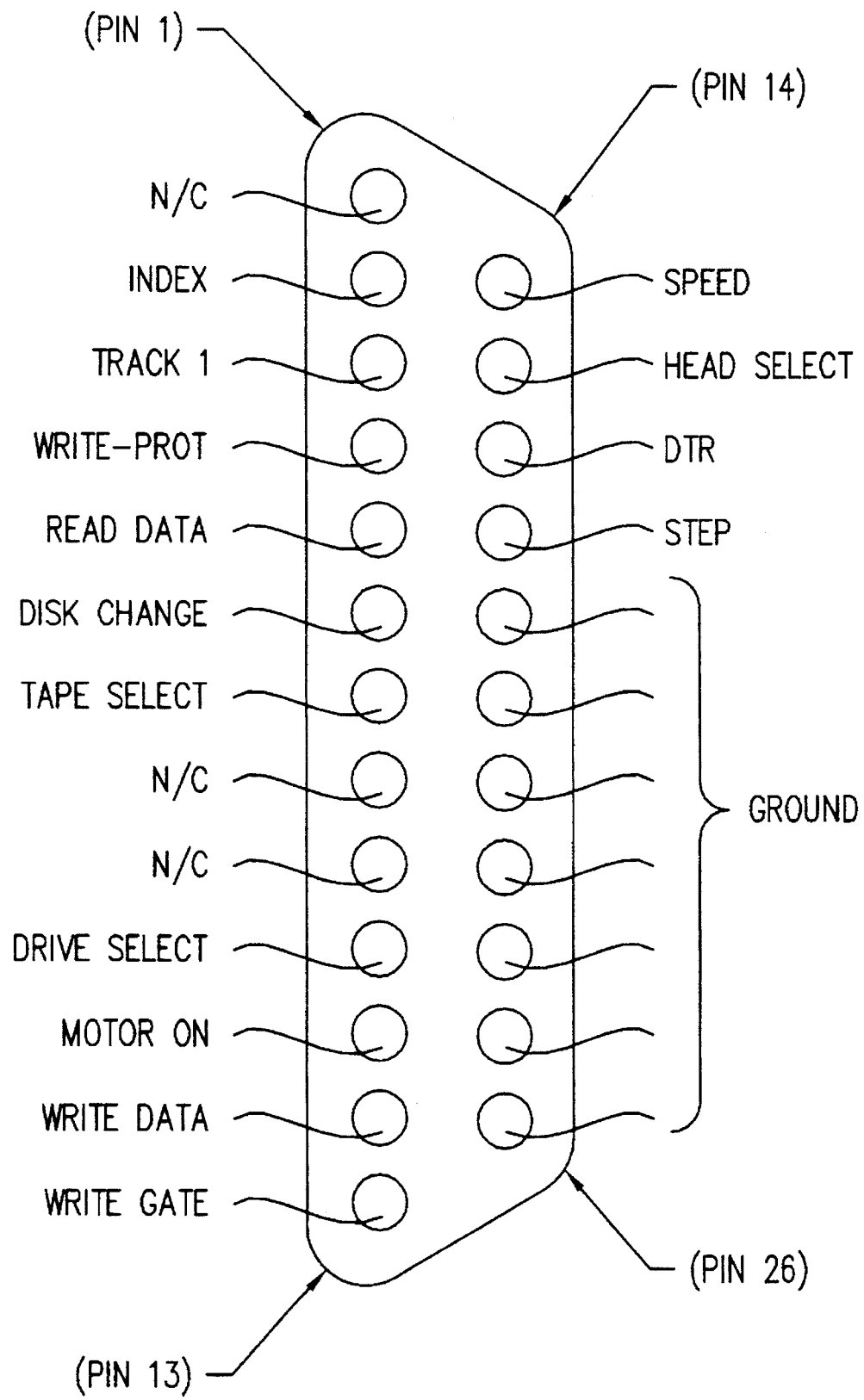
FIG. 2B shows the pin assignments used, according to the present invention, when the DB-25 parallel port connector is being used for interface to an external floppy drive (as in FIG. 1B) or tape drive (as in FIG. 1C).

However, when the computer is used with an external disk drive (or tape drive), the same physical connector is reconfigured to provide a different interface. FIG. 2B shows the nonstandard signal assignments which are used in this case.

Figure 2C:
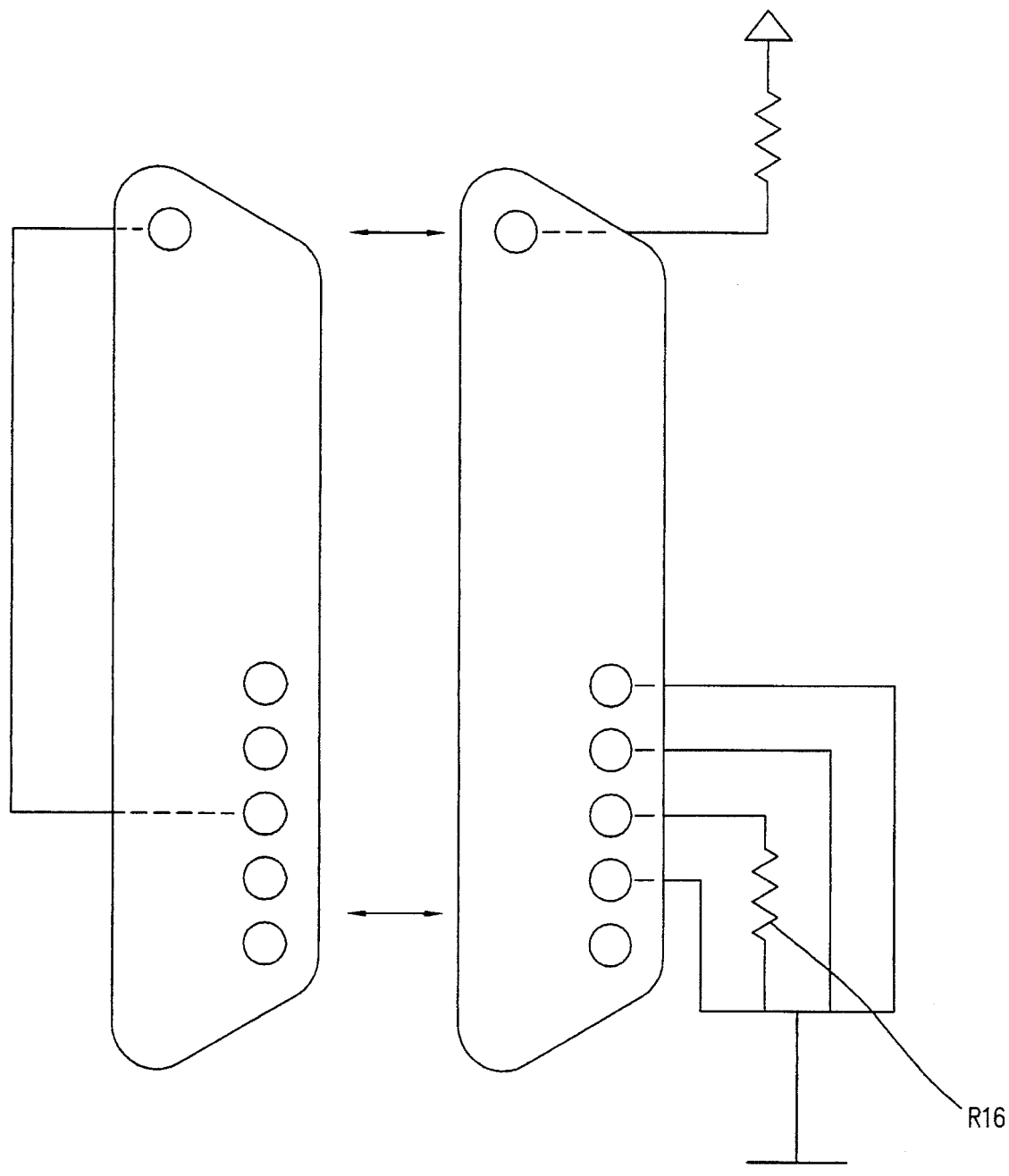
FIG. 2C illustrates connection between the DB-25 parallel port connector and an external connector configured for and attached to a non-printer external input/output device (floppy drive or tape drive).

Upon viewing FIG. 2B, a skilled artisan can appreciate non-printer type signals placed on the multi-pin connector of the chassis whenever a non-printer is connected thereto. As shown in FIG. 2C, by connecting a pair of pins together, an external multi-pin connector having connected said pins can indicate non-printer connection to the multi-pin connector upon the chassis. The chassis, and circuitry therein, can reconfigure the output signals shown in FIG. 2B from those shown in FIG. 2A whenever the common-connected pins of an external connector is coupled to the chassis connector, as shown in FIG. 2C.

External Data Storage Peripherals

In the presently preferred embodiment, two different non-printer peripherals can be connected to the printer port. However, both of these non-printer peripherals use the same interface.

Floppy Disk Drive

Figure 1B:
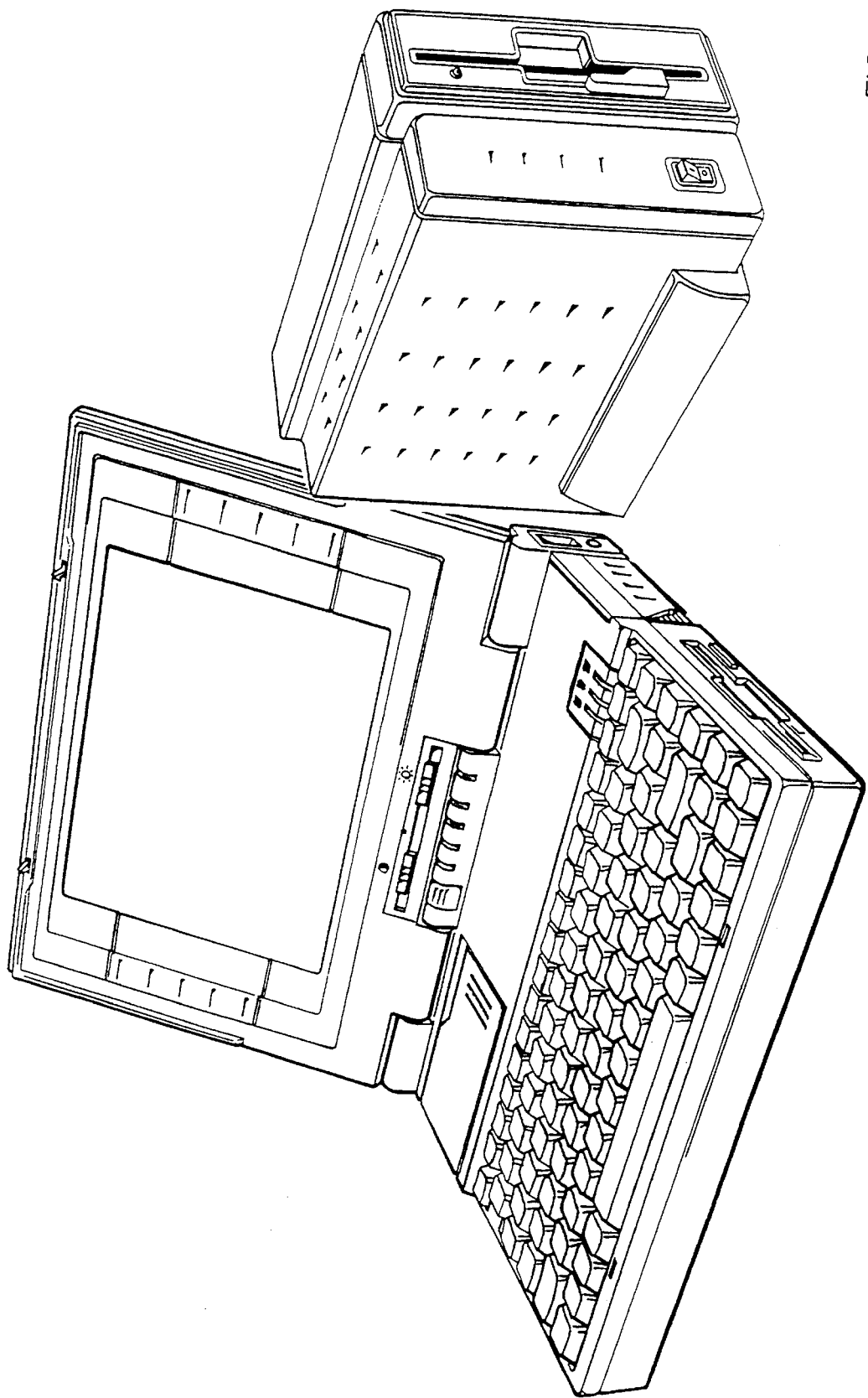
FIG. 1B shows the notebook computer of the presently preferred embodiment docked to an external floppy disk drive.

The floppy disk drive 120, shown in FIG. 1B, contains only a power supply (connectable to a standard 120V wall socket), a standard off-the shelf floppy disk drive, and a 150Ω resistor from pin 34 to RDY. In the presently preferred embodiment, this is a 1.2M Mitsubishi 504C drive; but of course any other standard 3½" or 5¼" floppy drive can be used instead.

In an alternative contemplated embodiment, it is anticipated that a small floppy drive can be used without an independent power supply, and can rob all necessary power through the interface cable. This is expected to be an advantageous embodiment, but this is not yet part of the presently preferred embodiment.

Tape Backup Drive

Figure 1C:
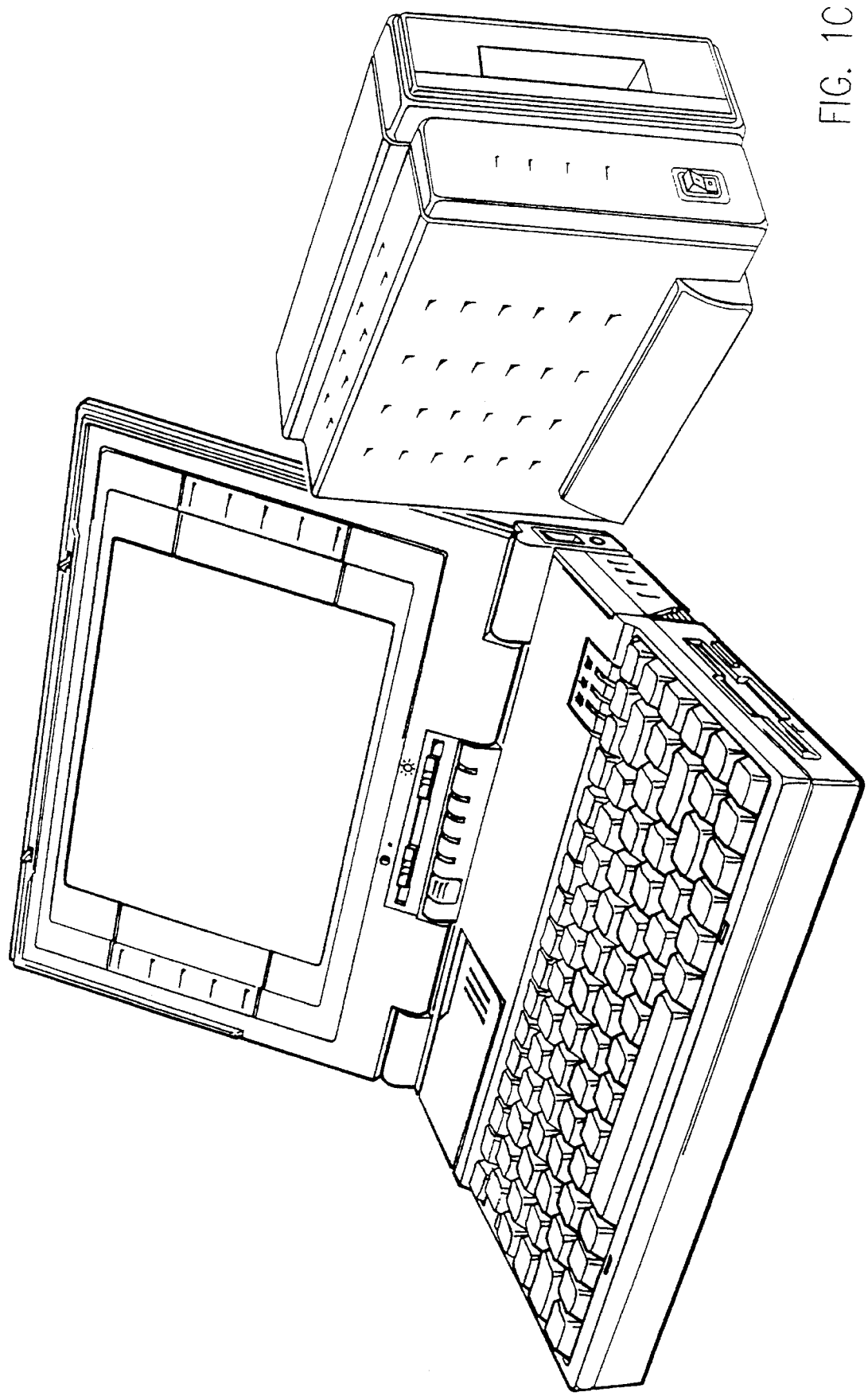
FIG. 1C shows the notebook computer of the presently preferred embodiment docked to an external tape backup drive.

The backup tape drive 130, shown in FIG. 1C, contains only a power supply (connectable to a standard 120V wall socket), a standard off-the shelf floppy disk drive, and a 470Ω pull-up resistor for presence detect. In the presently preferred embodiment, this is a 40M drive from Colorado Memory Systems, which uses DC2000 tape cartridges; but any other tape drive which accepts a standard floppy-disk interface can be used instead.

Detecting and Reconfiguring for Non-Printer Peripherals

As noted above, the presently preferred embodiment uses hardware to detect the presence of a non-printer peripheral, and uses a combination of hardware and software techniques to reconfigure the port to accommodate printer or non-printer peripherals.

Circuitry for Detecting a Non-Printer Peripheral

Figures 1, 5A:
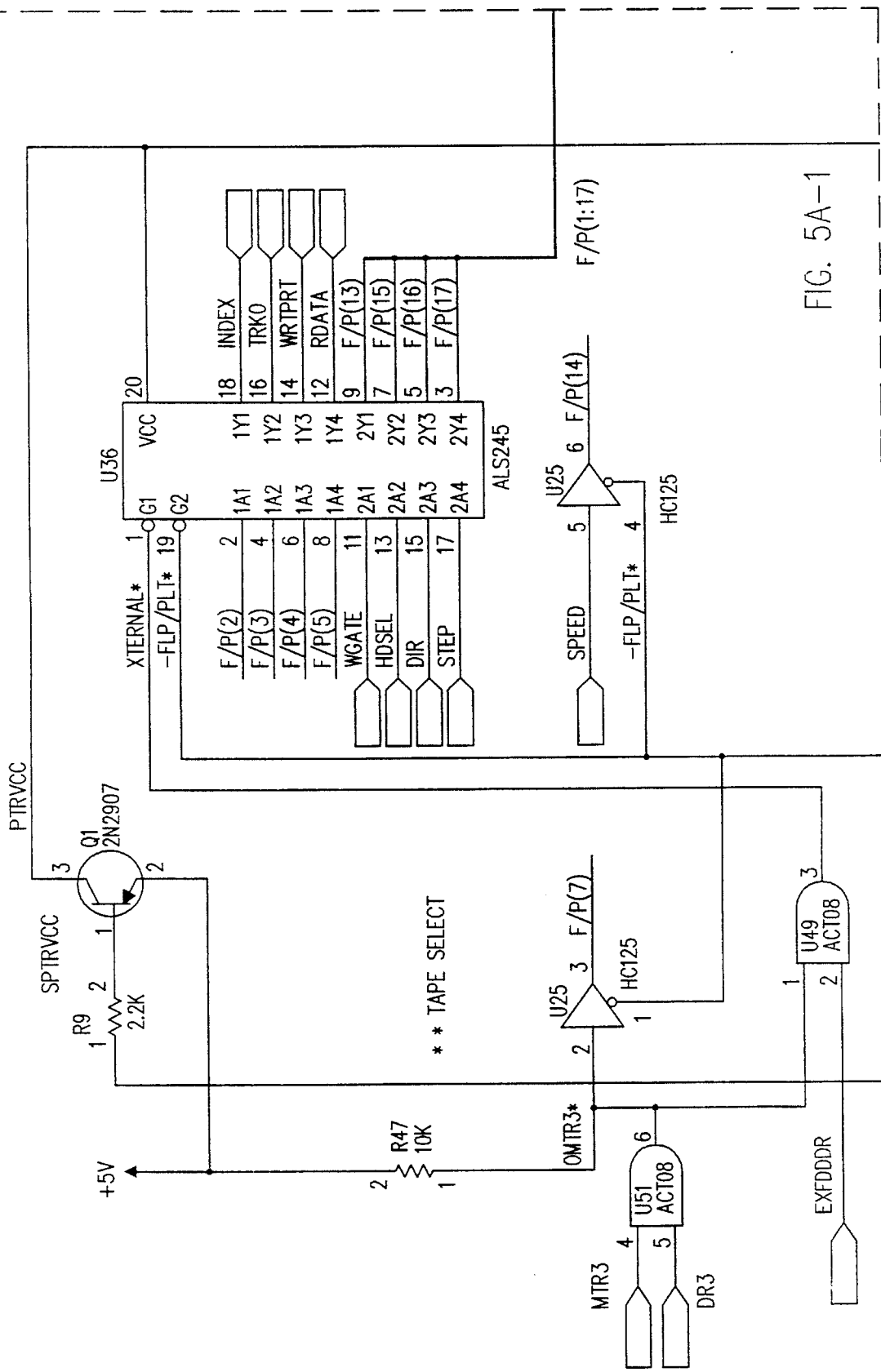
FIGS. 5A–5C are three interrelated circuit diagrams showing how the floppy disk controller is connected to the internal floppy drive cable and to the printer port.
Figures 2, 5A:
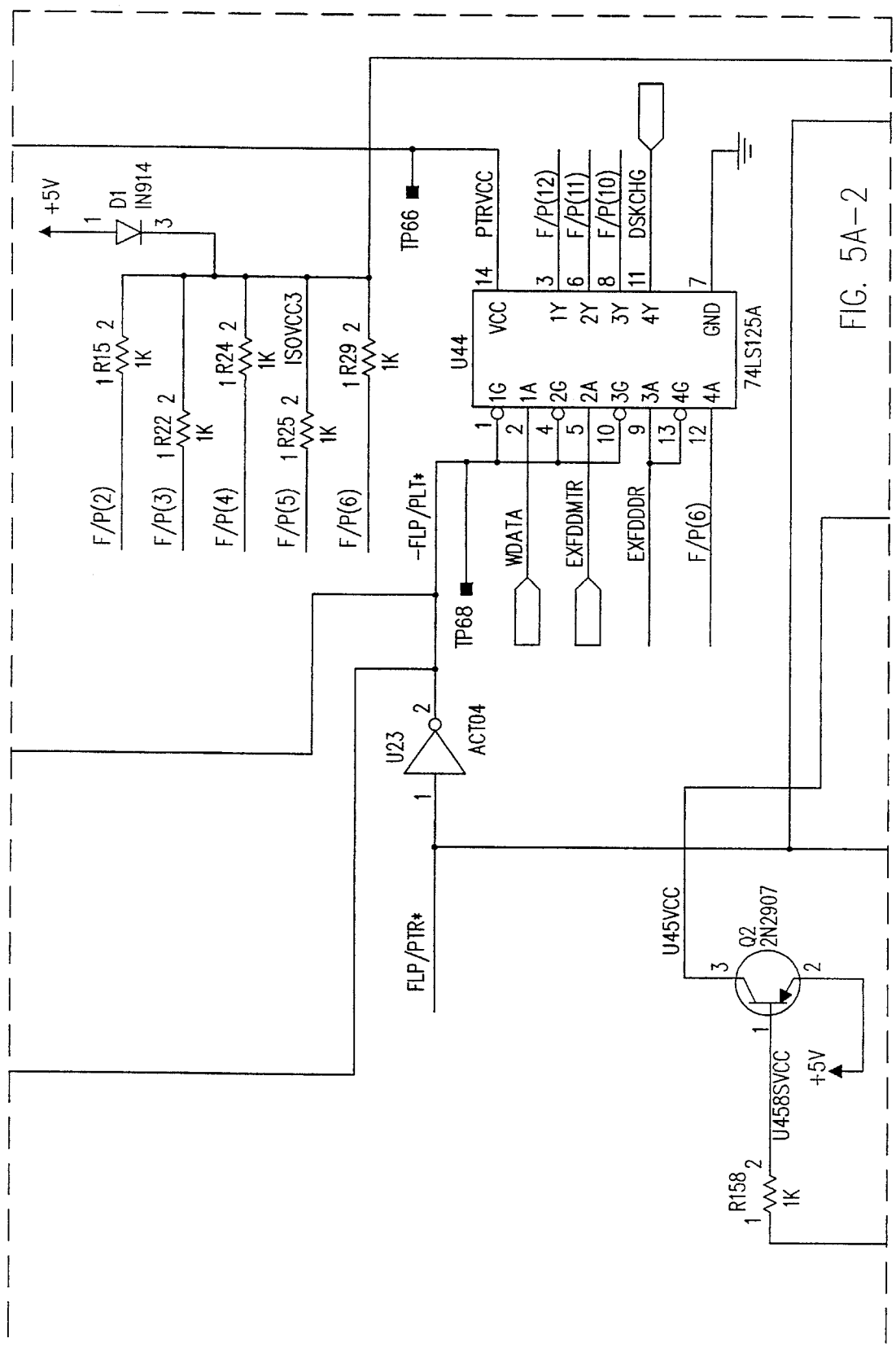
Figures 3, 5A:
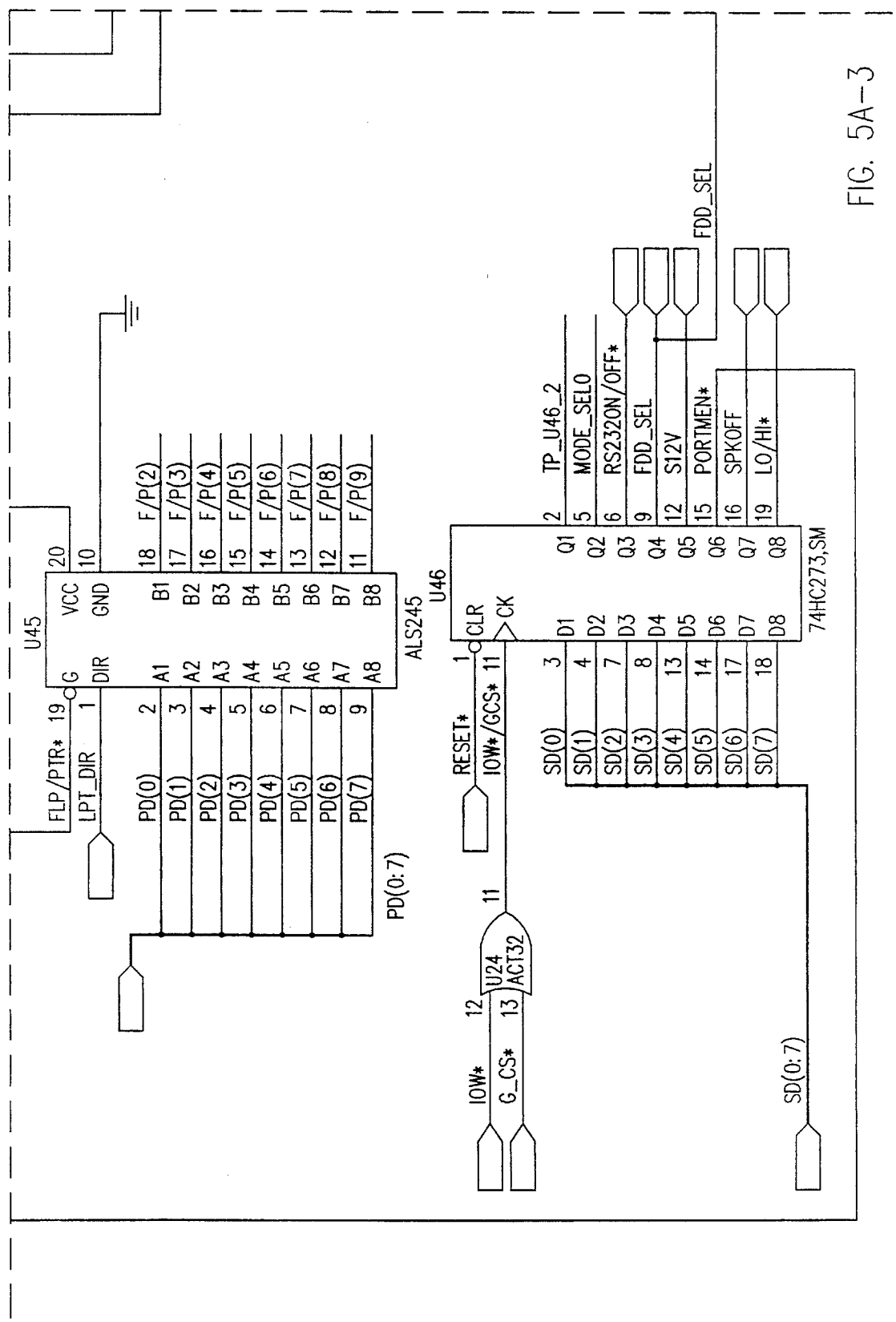
Figures 5, 5A:
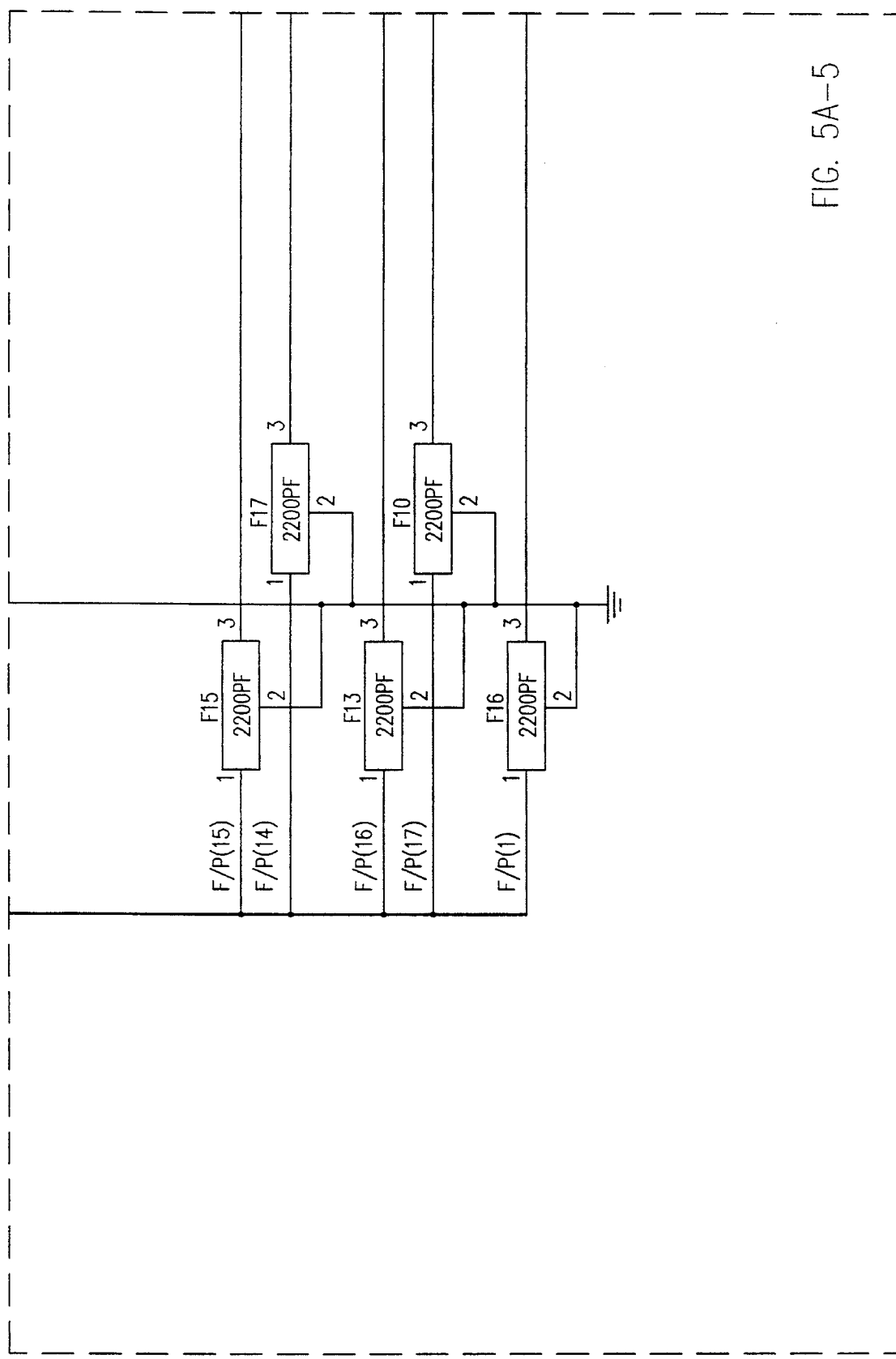
Figures 5, 5A, 6:
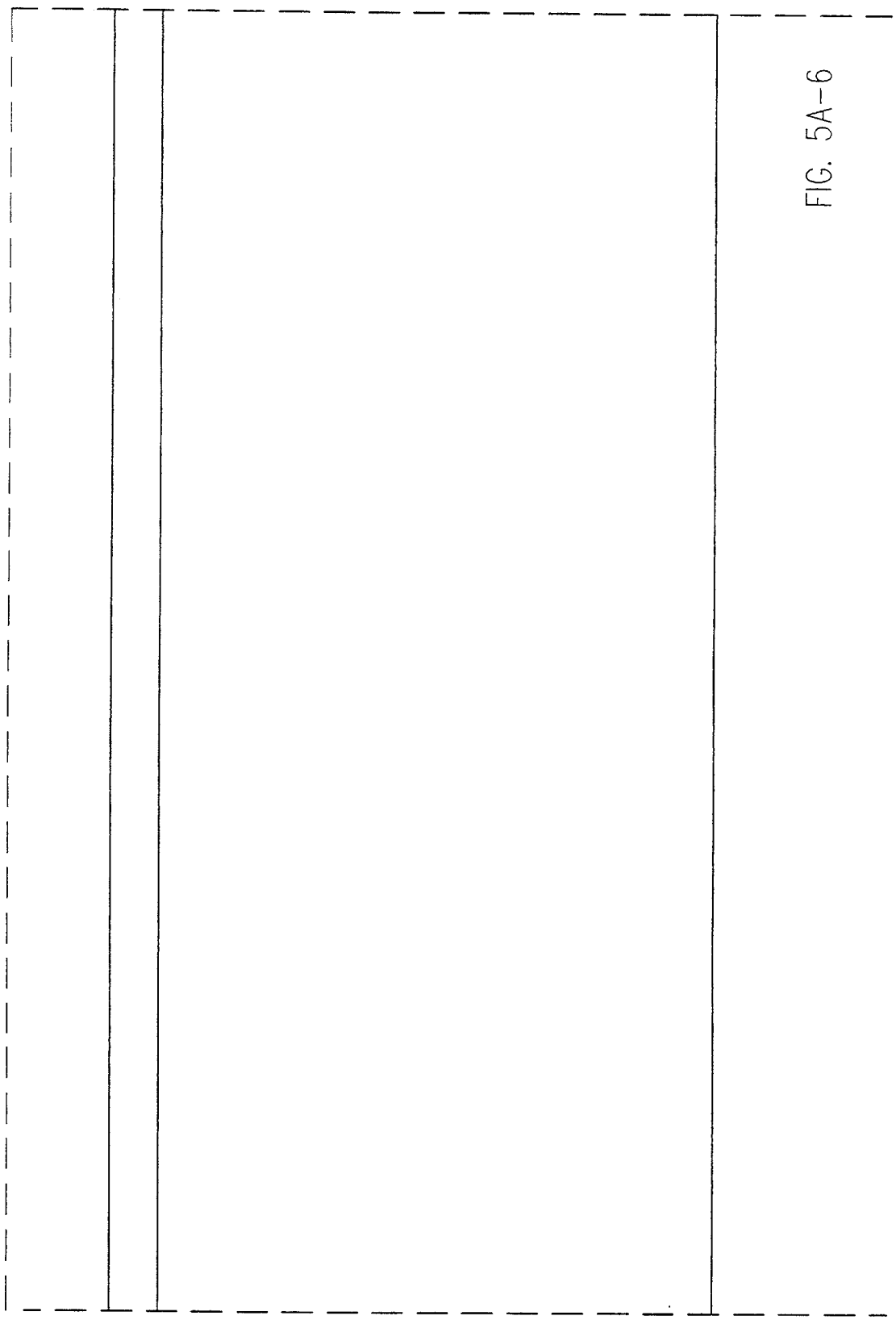
Figures 5, 5A, 6, 7:
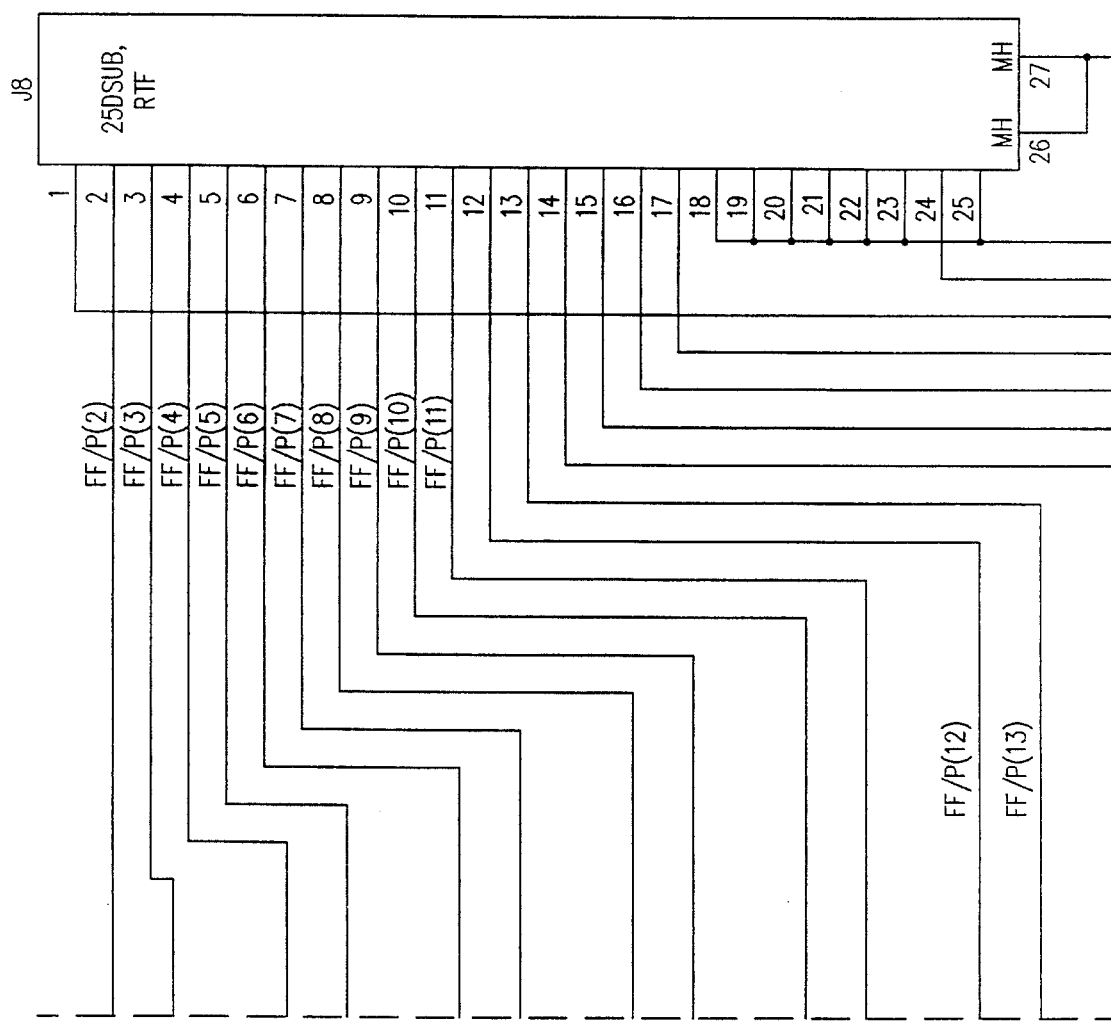
Figures 5, 5A, 6, 7, 8, 9:
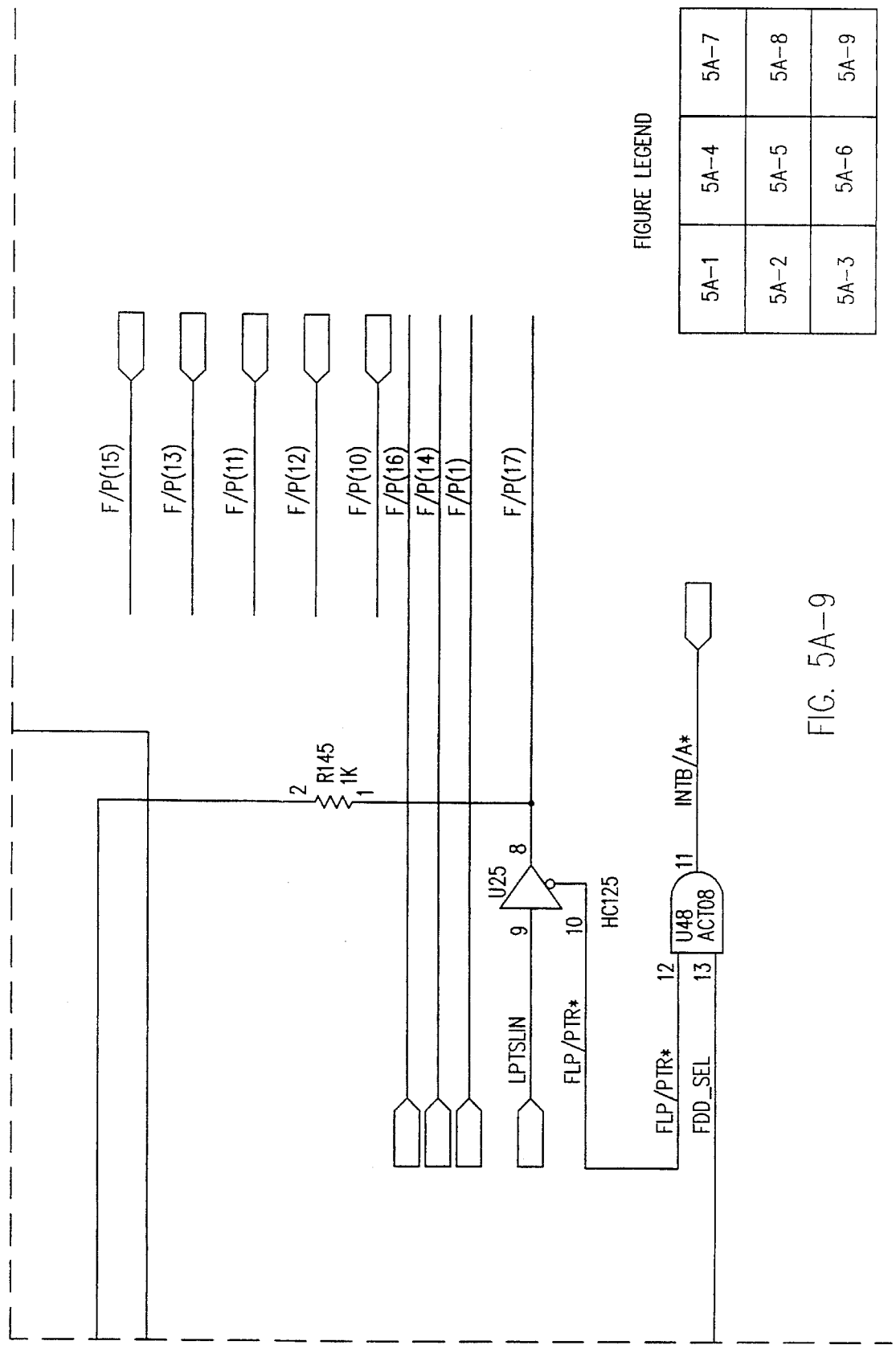
Figures 1, 5B:
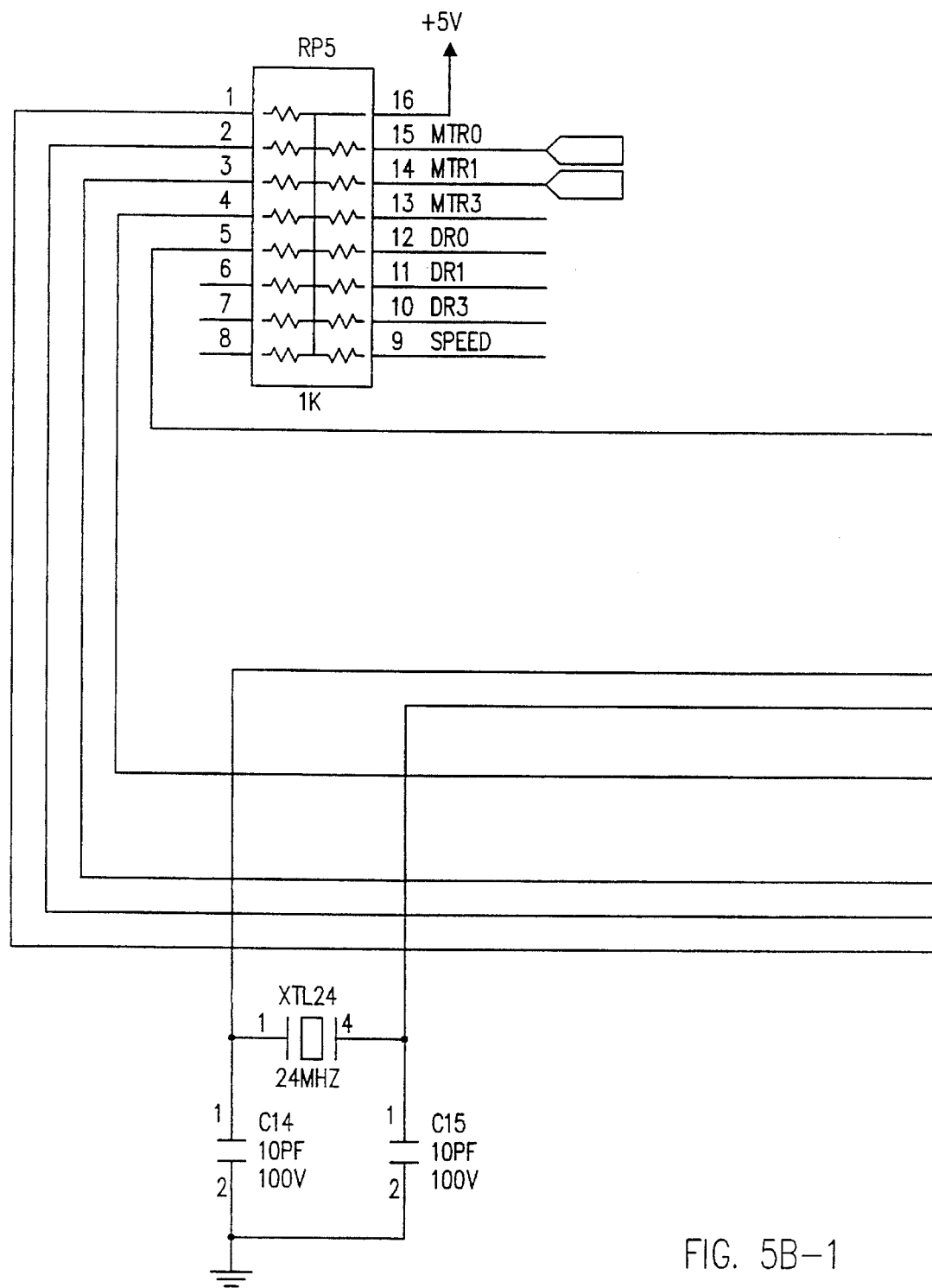
Figures 2, 5B:
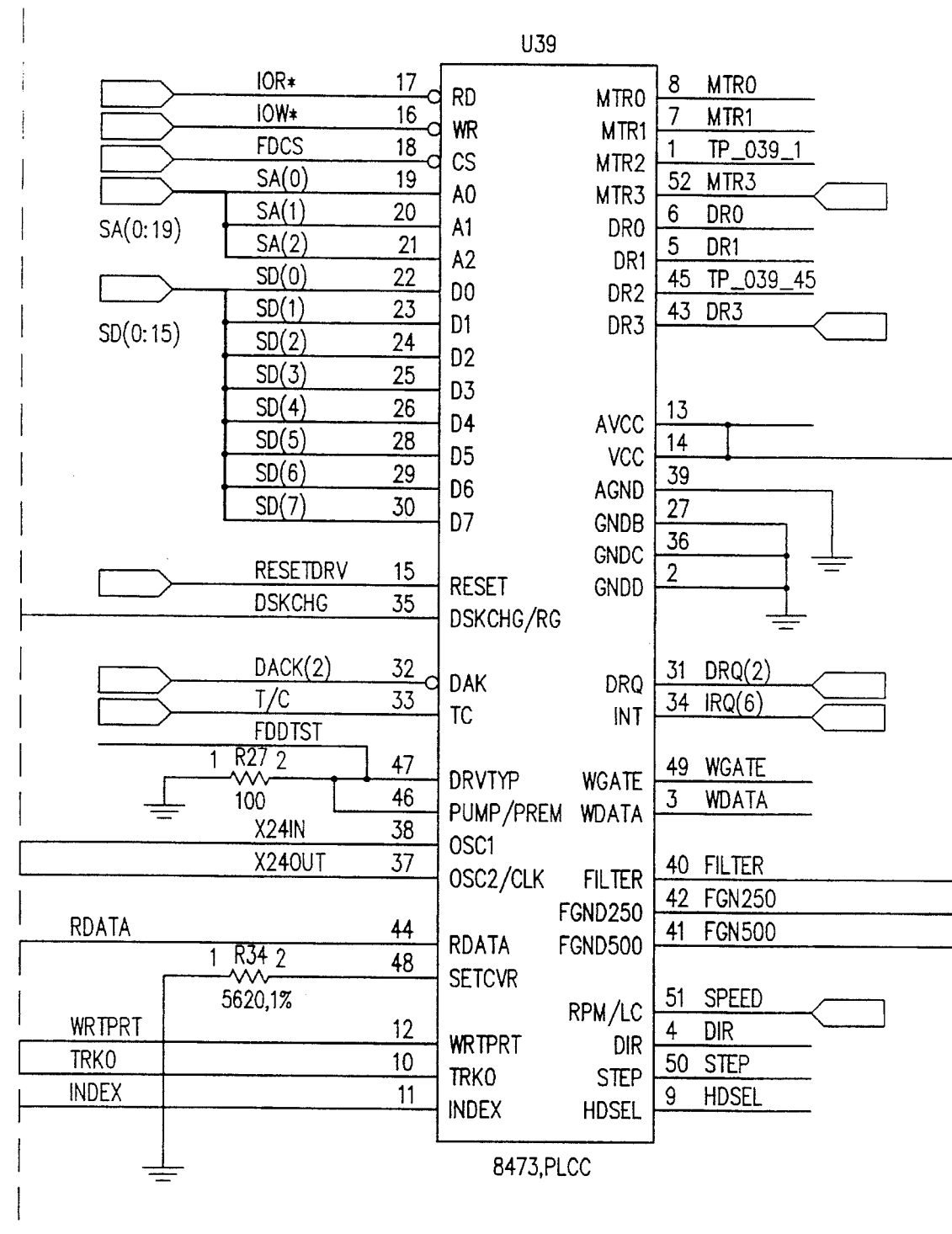
Figure 5B:
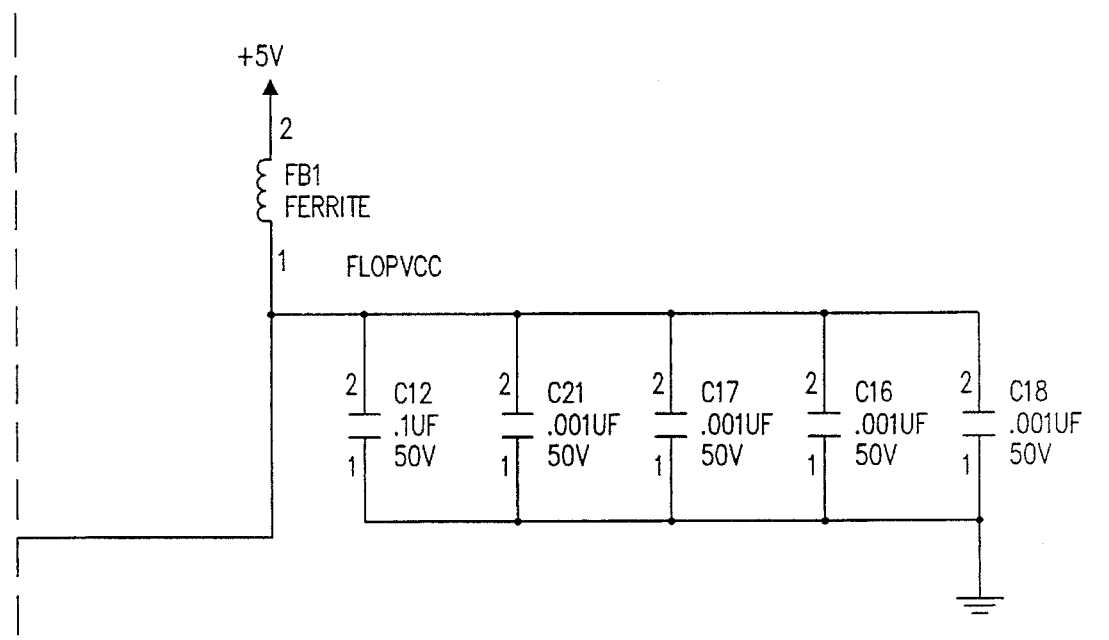
Figure 3:
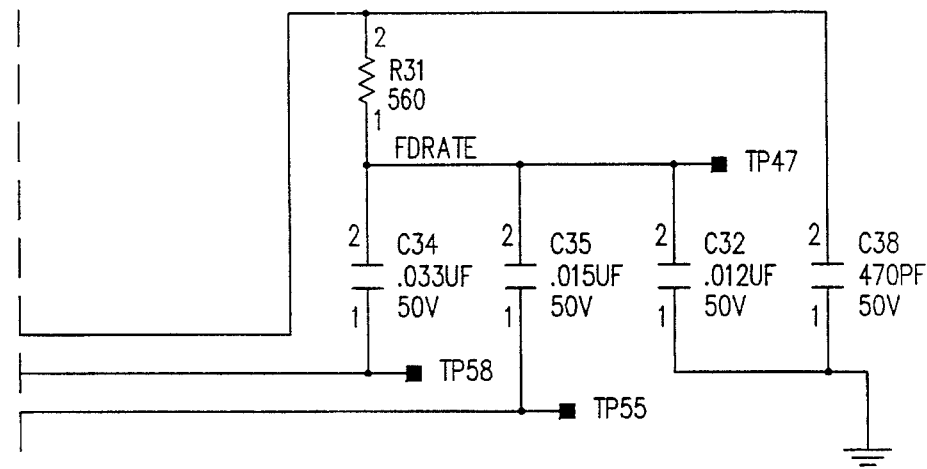
Figures 4, 5B:
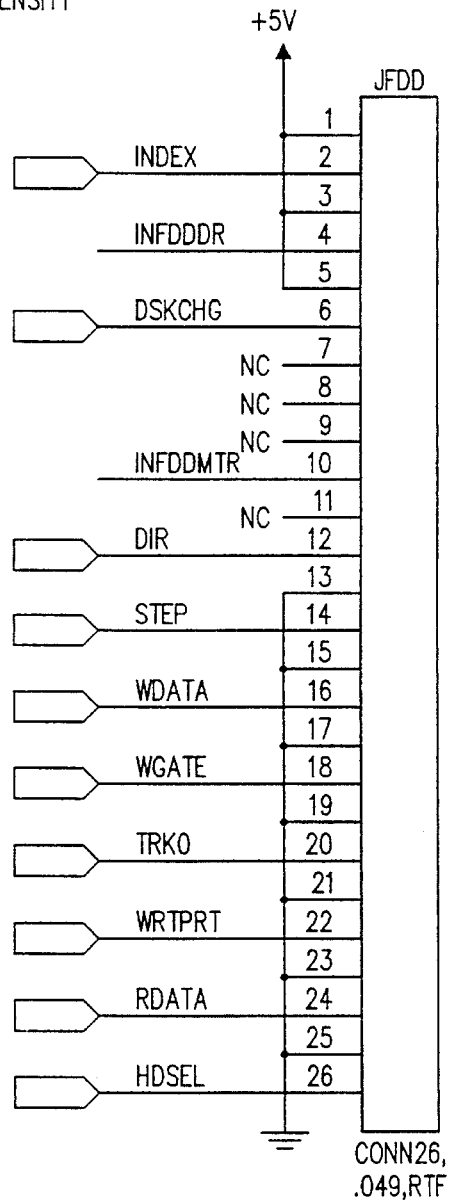
Figures 5, 5B:
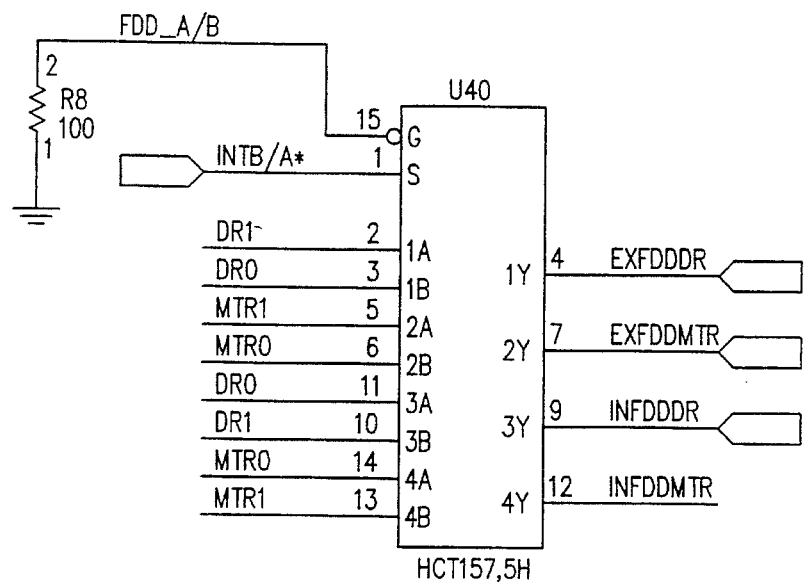
Figures 2, 5C:
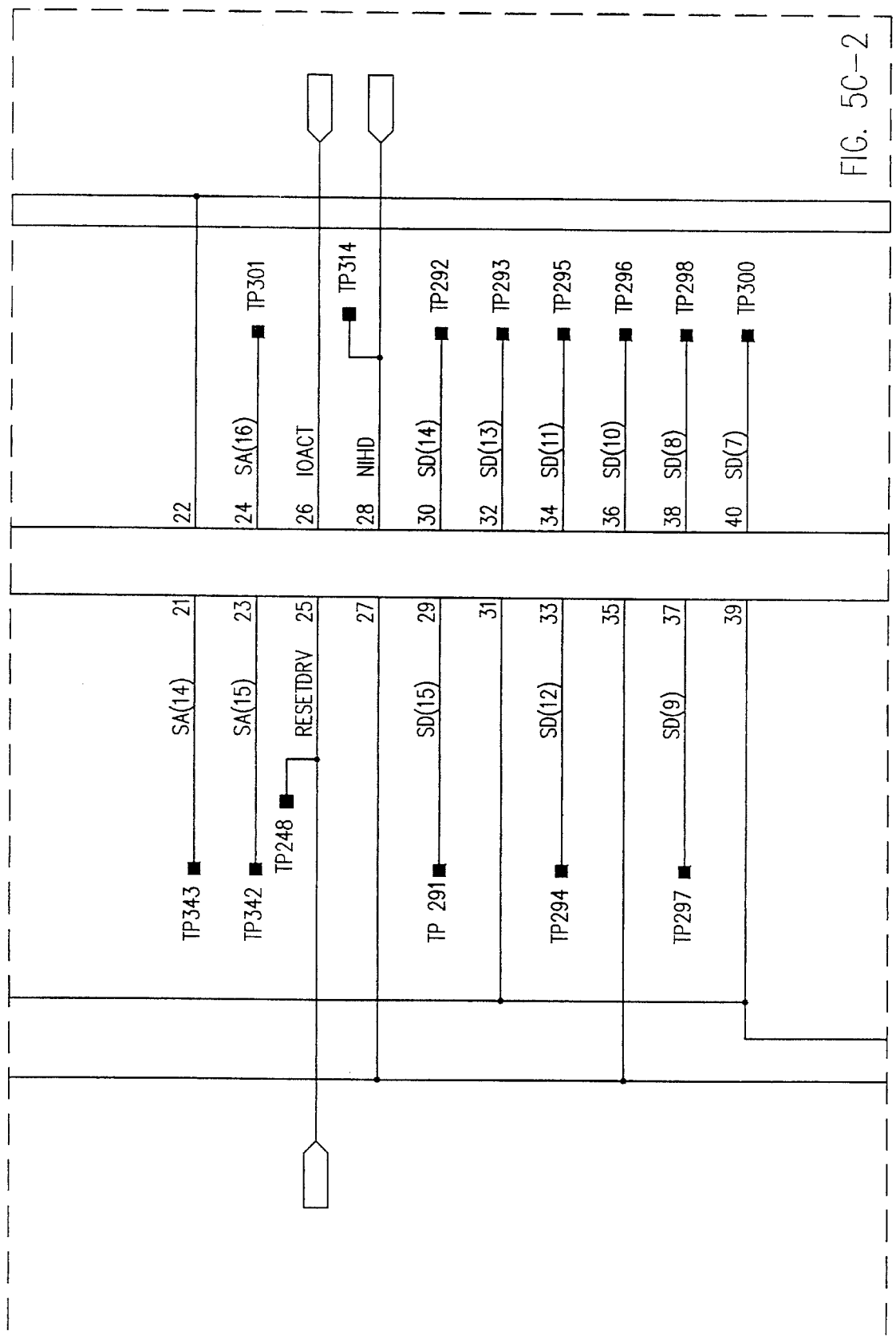
Figures 3, 5C:
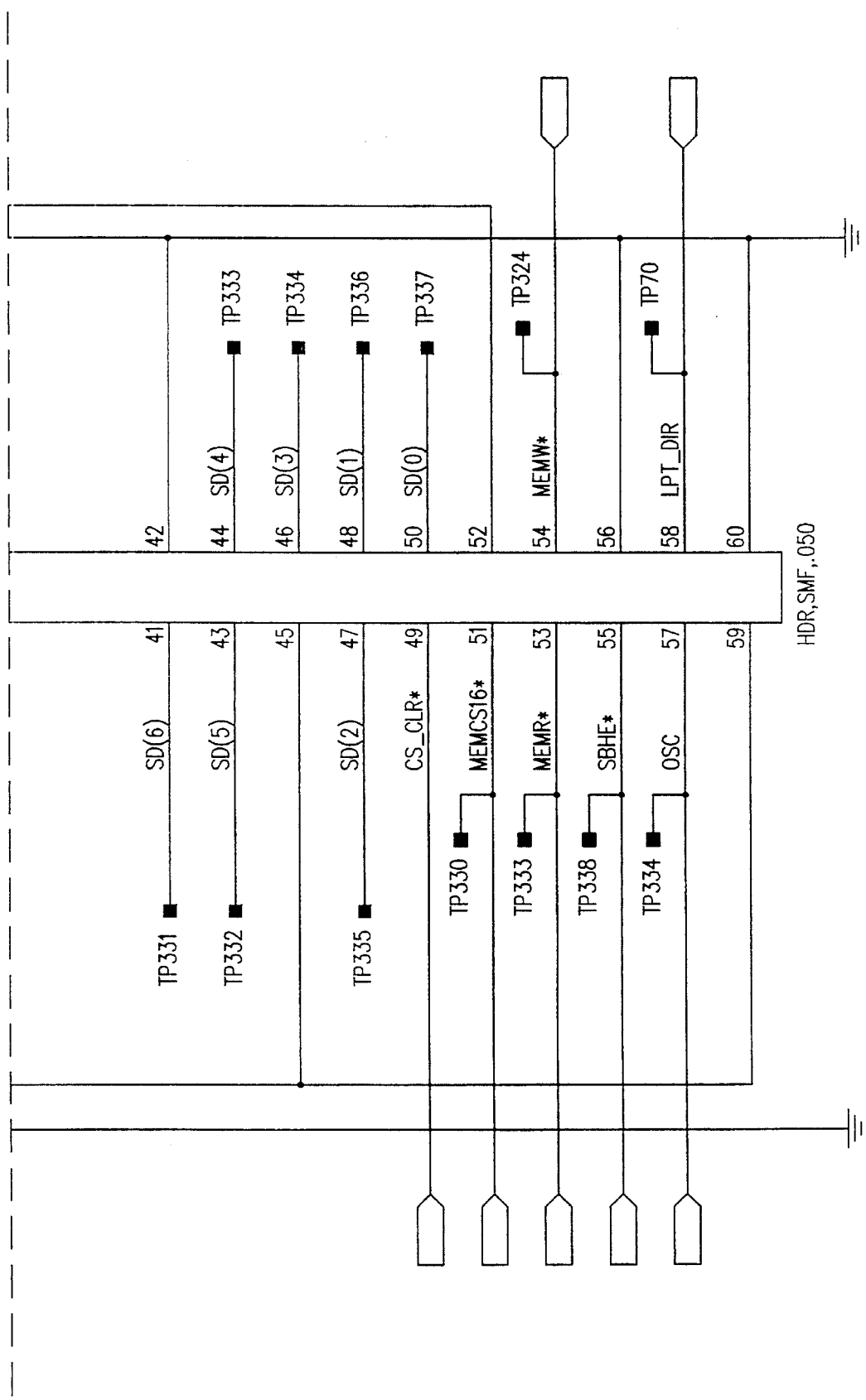
Figures 4, 5C:
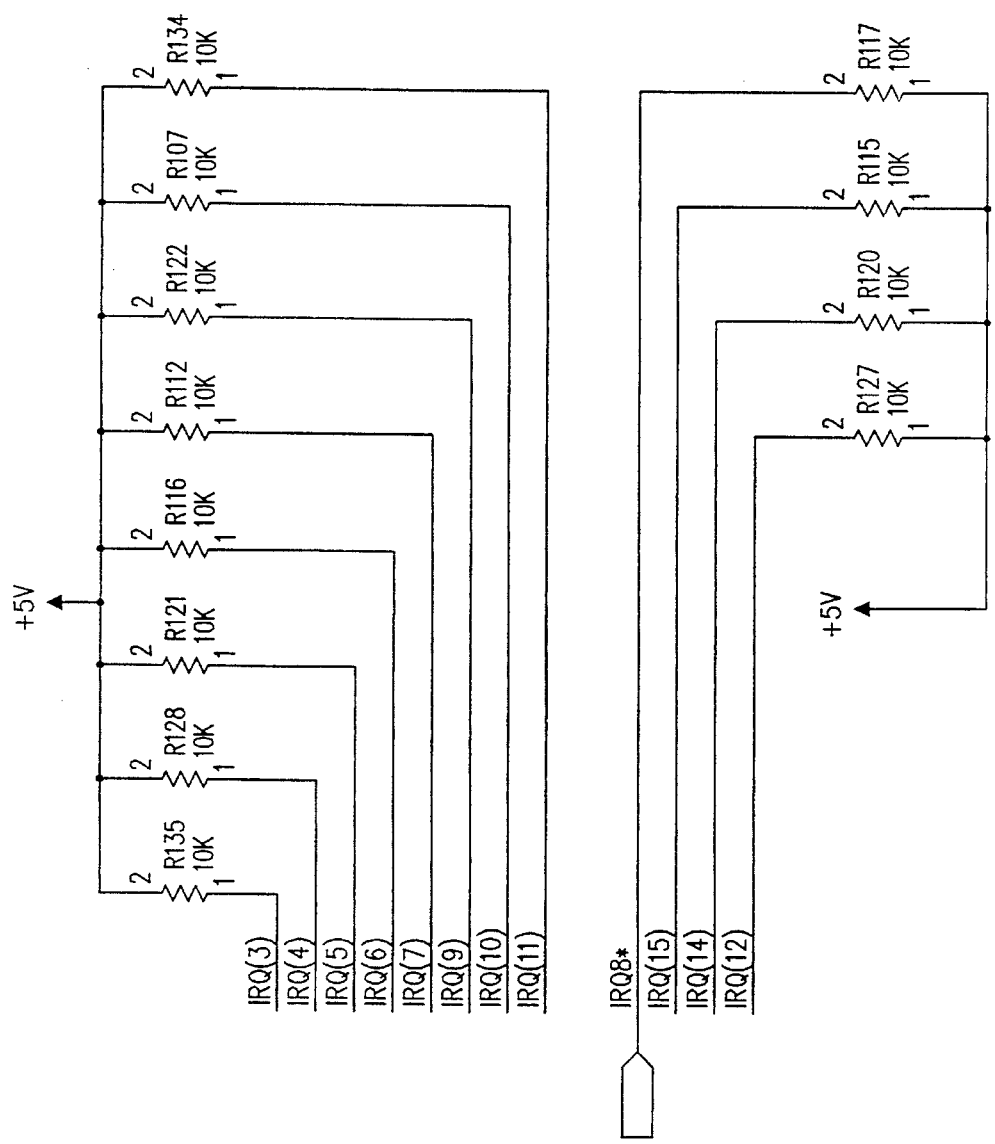
Figures 5, 5C:
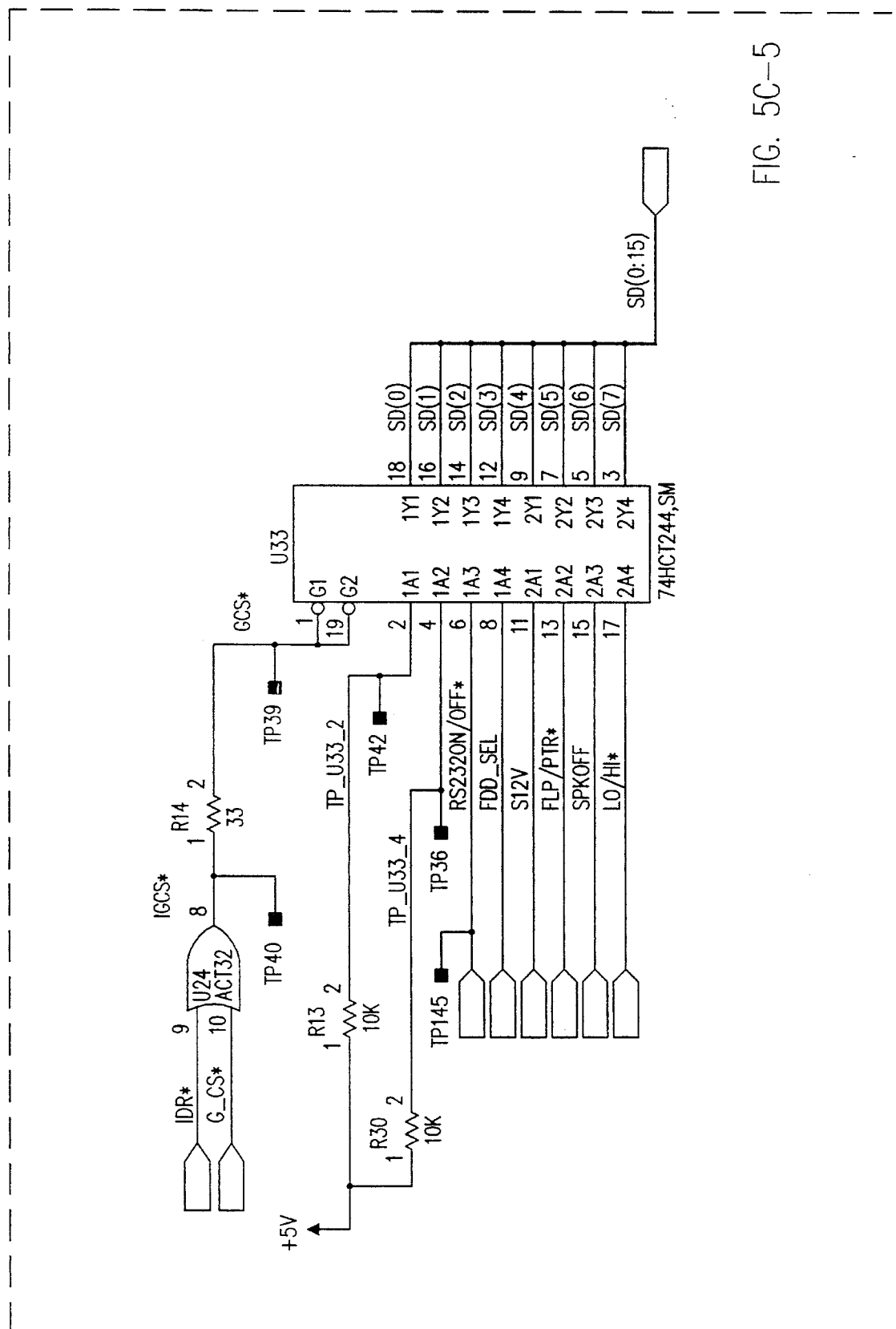
Figures 5, 5C, 6:
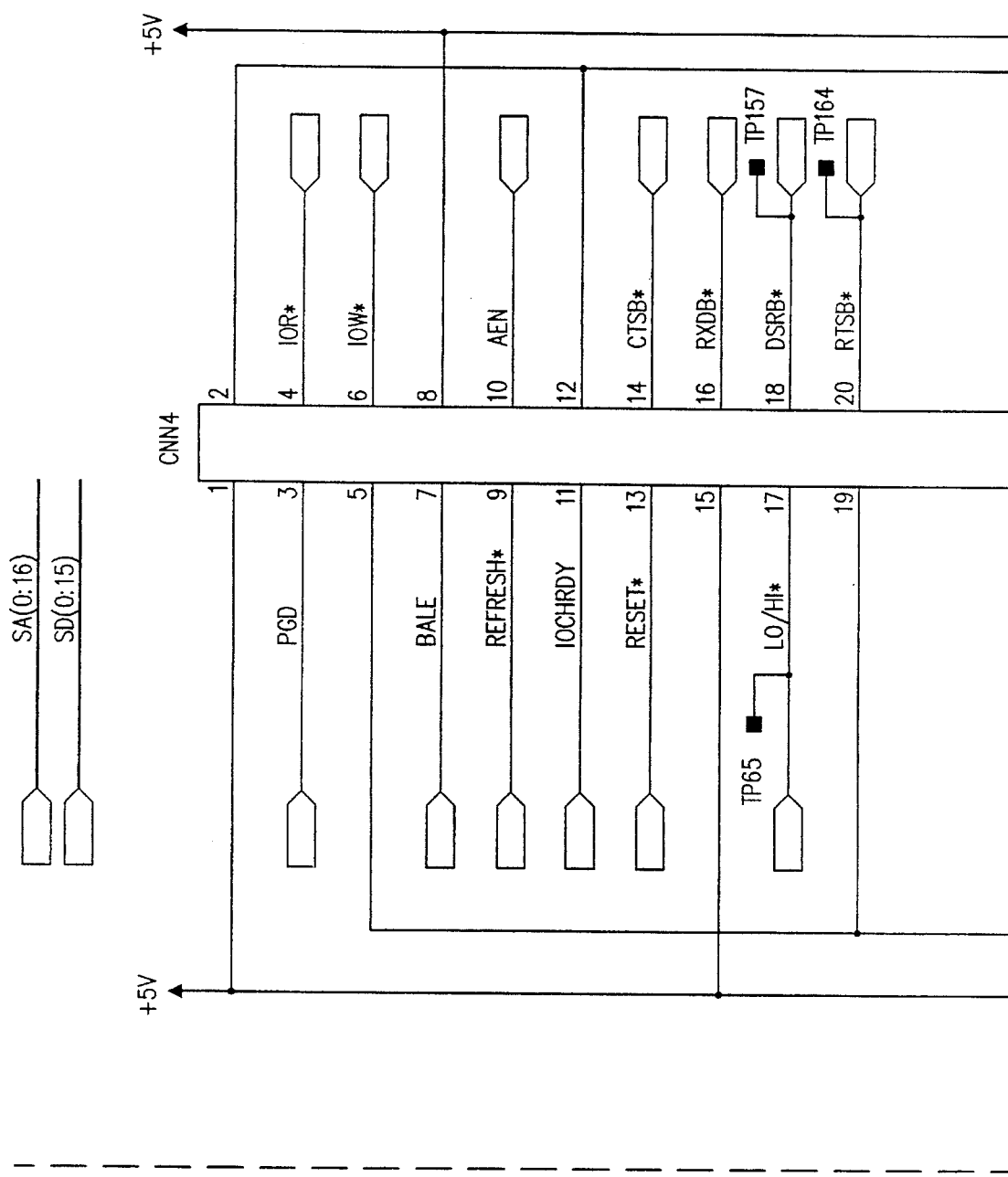
Figures 5, 5C, 6, 7:
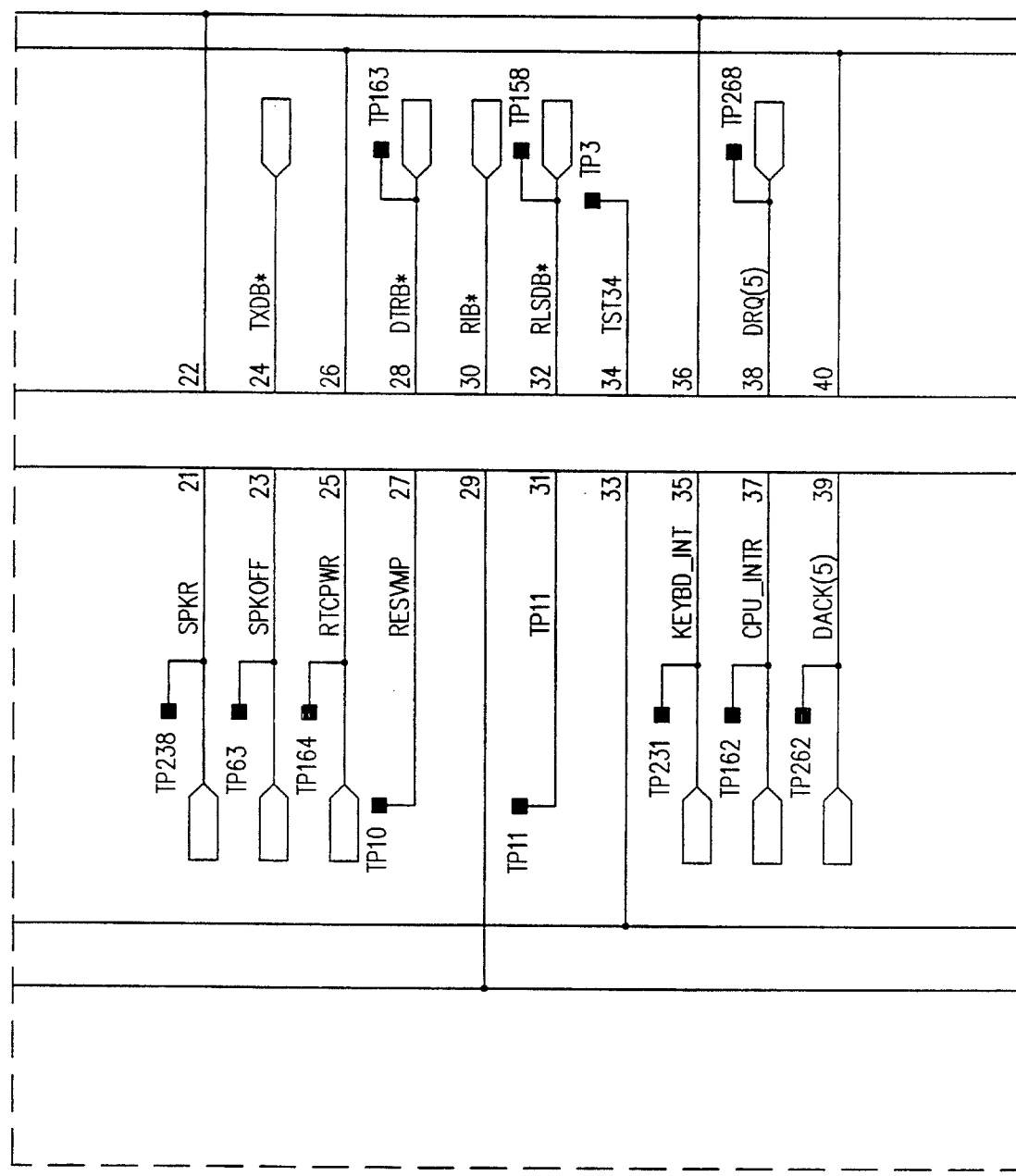
Figures 5, 5C, 6, 7, 8:
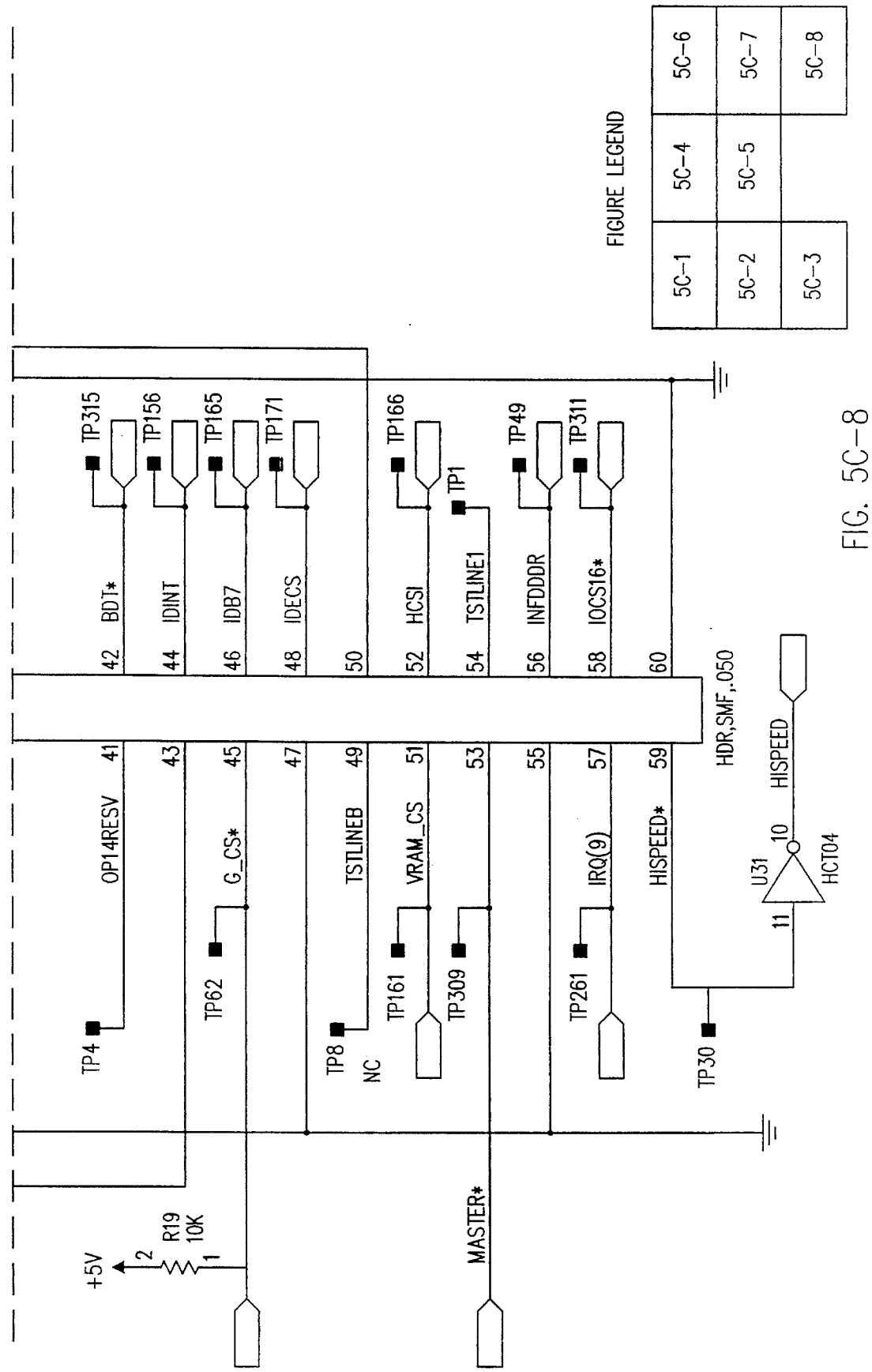

FIGS. 5A–5C show the circuit implementation which is used, in the presently preferred embodiment, to detect the presence of a non-printer peripheral. In the connections to printer port 390 510 (in the computer 100), a 10Ω resistor R16 is inserted between pin 24 and ground. (Normally, pin 24 is simply grounded, without any such interposed resistor.) This means that this pin can be pulled high, if an attached accessory provides a sufficiently strong pull-up. In the presently preferred embodiment, the external disk drive 120 and the external tape drive 130 both include a pull-up on this line.

Circuitry for Rerouting Non-Printer Signals to External Port

FIGS. 5A–5C also shows the hardware components to route the appropriate printer or floppy-controller signals to printer port 390.

In this sample embodiment, some pins use hardware multiplexing, but other pins use software controls to prevent electrical conflict. (However, in a further alternative embodiment which has now been implemented, The normal printer port lines F/P(1)–F/P(17) are connected to the appropriate lines of combination I/O chip 350 (shown in this FIG. 3E). These correspond to the signal functions shown in FIG. 2A.

Buffer U36 is turned on IF an external floppy 120 (or tape 130) is attached: in this case the buffer U36 drives 8 pins straight to the port with floppy-control signals.

Bipolar transistor Q1 on PTRVCC kills the VCC supply to chips U36 and U23, to prevent power consumption by these ALS chips unless a storage module is plugged in.

Software Implementation

Following is a sample specific implementation of software portions of the disclosed innovations. This example is intended to better illustrate the disclosed generally innovations, and to comply with the best-mode requirements of U.S. patent law; but of course this specific implementation is subject to change (and will certainly be changed as time goes by), and can be altered, as will be apparent to those skilled in the art, in many details.

The code portions set forth below provide the most relevant portions of the code used, but of course these code portions are used in combination with large additional portions of code. In the presently preferred embodiment, the software structure given below is used in combination with Phoenix™ BIOS code; but several vendors (such as AMI) offer BIOS software, and the disclosed code can be used with another vendor's BIOS code if desired. (Of course, minor adjustments would have to be made to the called routine names, etc.)

Procedure "Floppy_AB"

The following is the main procedure, and is called from POST:

```
Floppy_AB       proc    near
                call    get_gcs
                and     al,NOT MASK gcs_fddsel    ;The presently preferred embodiment uses
                                                   bit shadowing - so it is necessary
                                                   to read and write even if the bit is
                                                   unchanged.
                call    flipit
                jz      a144
                or      al,MASK gcs_fddsel
a144:
                call    put_gcs12
                test    al,MASK gcs_flpptr
                mov     al,0
                jz      noextflop
                mov     al,EXT_FLOP_TYPE13
                call    CMOSRead                  ;get floppy types from cmos
                and     al,MASK EXT_FLOP
noextflop:
                mov     bl,al
                or      al,40h                    ;stuff 1.44M into A: drive slot
                call    flipit
                jz      noswitch                  ;keep A: as 1.44M?
                rol     al,4                      ;switch them around14
noswitch:
                mov     ah,al
                mov     al,CMFDSK
                call    CMOSWrite                 ;stuff them back
                mov     al,CMEQPT15
                call    CMOSRead
                mov     ah,al
                and     ah,not 0c1h               ;erase floppy bits
                test    bl,MASK EXT_FLOP          ;if external diskette then update
                jz      oneDisk                   ;CMOS Equip byte accordingly
                or      ah,040h                   ;set both floppies present
oneDisk:
                or      ah, 1                     ;diskette drive present
                mov     al,CMEQPT
                call    CMOSWrite
                ret
Floppy_AB       endp
```

[12]This procedure is also listed in the present application.
[13]This corresponds to an address in an OEM reserved area.

Procedure "flipit"

The following procedure is called by procedure Floppy_AB:

```
;Returns Z if A: drive is Internal
;Returns NZ if A: drive is External
;
flipit    proc    near
          push    ax
          mov     al,enable2
          call    CMOSRead            ;get floppy A/B bit from cmos: this determines
                                       whether the external drive, if present, is
                                       to become the "A:" drive.
          test    al,MASK bootflop
          jz      noflip
          call    get_gcs[16]         ;if floppy not installed
          test    al,MASK gcs_flpptr" ;then A: drive is always the internal
noflip:
          pop     ax
          ret
flipit    endp
```

[14]The A: and B: descriptors are stored as two 4-bit numbers in an 8-bit register; this barrel-shift operation interchanges them.
[15]This shows how many floppy drives are present.

Procedure "get_gcs"

The following procedure reads the Generic Chip Select port, and returns the resulting data in register AL.

The Generic Chip Select, in the presently preferred embodiment, is implemented using chips U33 (for read) and U46 (for write). Chip U46 is the Put_GCS buffer (with one bit assigned as fddsel), and U33 carries bit flpptr.

Procedure "put_gcs"

The following procedure writes the data in register AL to the Generic Chip Select port:

```
;
;       get_gcs - Read the Generic Chip Select port
;
;       INPUT: NONE
;       OUTPUT: AL = data from Generic Chip Select port
;
get_gcs   proc    near
          mov     al,VTI_106_CONTROL_1
          out     CMOS_INDEX,al
          in      al,CMOS_DATA
          test    al,VTI_CS6_ENABLED     ;The MILES chip[18] was found to have a bug;
                                          so the CS6 line was used, in later
                                          versions, to circumvent possible
                                          difficulty.
          jz      old_getgcs
          in      al,gcs_106
          ret
old_getgcs:
          push    dx
          push    ax
          mov     dx,miles_ir
          in      al,dx                  ;read and save miles_ir
          mov     ah,al
          mov     al,miles_gcs           ;point to gcs
          out     dx,al
          inc     dx
          in      al,dx                  ;get the data
          xchg    ah,al
          dec     dx
          out     dx,al                  ;restore miles_ir
          mov     dl,ah
          pop     ax
          mov     al,dl
          pop     dx
          ret
get_gcs   endp
```

[16]This procedure is also listed in the present application.
[17]This bit tells which floppy is which.
[18]The MILES chip is described in great detail in co-pending commonly owned U.S. Pat. application of Stewart, Ser. No. 07/655,889, filed approximately 2/15/91, entitled "Portable Computer with BIOS-independent Power Management", which is hereby incorporated by reference.

```
;
;            put_gcs - Write the Generic Chip Select port
;
;            INPUT: AL = data for Generic Chip Select port
;            OUTPUT: NONE
;
put_gcs      proc    near
             push    ax
             mov     al,VTI_106_CONTROL_1
             out     CMOS_INDEX,al
             in      al,CMOS_DATA
             test    al,VTI_CS6_ENABLED
             pop     ax
             jz      old_putgcs
             out     gcs_106,al
             ret
old_putgcs:
             push    ax
             push    bx
             push    dx
             mov     bl,al
             mov     dx,miles_ir
             in      al,dx                       ;read and save miles_ir
             mov     ah,al
             mov     al,miles_gcs                ;point to gcs
             out     dx,al
             inc     dx
             mov     al,bl
             out     dx,al                       ;put the data
             mov     al,ah
             dec     dx
             out     dx,al                       ;restore miles_ir
             pop     dx
             pop     bx
             pop     ax
             ret
put_gcs      endp
```

Port Disable

The following code disables the normal interface to the parallel port:

```
;Find out how many parallel printers there are. *****************************
IFDEF    full_smartvu
         TREPORT[19]     , <CfgP> ; Configuring parallel port(s).
ENDIF
         mov     al,VTI_106_CONTROL_0    ;Turn on LPT[20]
         call    CMOS_Read
         or      al,00010000b
         mov     ah,VTI_106_CONTROl_0
         call    CMOS_Write
         mov     dx,PRTPT1 + 2           ;(writing to direction bit:
         mov     al,4                    ;Set Miles to Output)
         out     dx,al
         mov     dx,PRTPT2 + 2
         mov     al,4                    ;Tri-state open drain VTI 106
         out     dx,al                   ;pins -AFD and -INIT[21]
         mov     al,VTI_106_CONTROL_0    ;Turn off LPT
         call    CMOS_Read
         and     al,11101111b
         mov     ah,VTI_106_CONTROL_0
         call    CMOS_Write
         call    get_gcs
         test    al,MASK gcs_flpptr
         jnz     lpt_off                 ;force LPT off if floppy plugged
                                         ;into parallel port
         mov     al,VTI_106_CONTROL_0    ;Turn on LPT
         call    CMOS_Read
         or      al,00010000b
         mov     ah,VTI_106_CONTROL_0
         call    CMOS_Write
```

[19]This is a routine which displays diagnostic messages on the SmartVu display. In this case, if a SmartVu display is present, the characters "CfgP" will be displayed.

[20]The following steps serve to disable the normal parallel port driver.
[21]Note that the normal port control functions are being used in an unusual way.

Resumption of Normal POST

After the unusual steps described above, the following code resumes the normal sequence of POST operations (checking to see if the printer port controller is enabled).

```
lpt_off:
       mov    bx, offset LPADRTBL    ;where to store the lp addresses.
       mov    dx, PRTPT1             ;printer port on monochrome board.
       call   PRTCHK                 ;note that PRTCHK will increment
                                     ;the Printer Port Table Index (BX)
       mov    dx, PRTPT2             ;Try for next port
       call   PRTCHK
       mov    dx, PRTPT3             ;and the 3rd adapter
       call   PRTCHK                 ;base address.
```

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

Other floppy-compatible peripherals could also be connected to the printer port. For example, one such embodiment which is contemplated as possibly advantageous attaches a SCSI bus through the printer port. This would permit use of peripherals such as a CD-ROM drive or an external hard disk.

In an alternative class of embodiments (which have actually been implemented), the port is treated as TWO ports: one incoming and one outgoing. While this approach preserves significant advantages of the disclosed innovations, it has been found not to be preferable. Also, in this alternative class of embodiments, software arbitration is used to avoid conflicts on some of the pins, and electrical rerouting (by hardware multiplexers) is used on others. This is done by disabling the parallel port controller whenever connection of an external floppy drive is detected. In this embodiment, the processor can be interrupted by a high-priority interrupt FLOPSMI (which is higher priority than the non-maskable interrupt NMI).

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A computer system, comprising:
   a system chassis including therein
      at least one central processing unit (CPU);
      at least one externally accessible multi-pin data connector which conforms to a mechanical and electrical specification of a standard connector format;
      port interface circuits connected to sense and to drive plural pins of said externally accessible data connector;
      a disk drive controller coupled to plural pins of said externally accessible data connector; and
      multiplexing logic coupled to said externally accessible data connector, said port interface circuits, and said disk drive controller;
   a first cable incorporating multiple data wires, and having a first multi-pin connector thereon which matches both mechanical and electrical specifications of said standard multi-pin connector format;
   a first external input/output device, which is physically separate from said system chassis, and which is connected to said first cable to provide bidirectional data communication using a first protocol, through said first cable and said first connector thereof and said externally accessible connector on said chassis, to and from said port interface circuits, said first external input/output device is a printer device;
   a second cable incorporating multiple data wires such that each of said multiple data wires is connected to a respective pin of a second multi-pin connector, said second multi-pin connector matches both mechanical and electrical specifications of said standard multi-pin connector format, except that a first pin of said second connector of said second cable, which carries a fixed voltage in the electrical specifications of said standard format, is electrically connected to a second pin of said second connector of said second cable so that said second pin also carries said fixed voltage, and the presence of said fixed voltage on said second pin is noncompliant with the electrical specifications of said standard format;
   a second external input/output device, which is physically separate from said system chassis, and which is connected to each of said multiple data wires of said second cable to provide bidirectional data communication using a second protocol, through said second cable and said second connector thereof and said externally accessible connector on said chassis, to and from said port interface circuits, said second external input-output device is a different device type than said printer device; and
   wherein said CPU includes means for querying said port interface circuits to ascertain the voltage of a second pin of said externally accessible connector on said chassis, such that said CPU can automatically switch to said first protocol when said first cable and first external device are connected to said externally accessible connector on said chassis, and can automatically switch to said second protocol when said second cable and second external device are connected to said externally accessible connector on said chassis, wherein said multiplexing logic electrically connects said externally accessible data connector and said port interface circuits when said first cable and first external device are connected to said externally accessible connector on said chassis, and said multiplexing logic electrically connects said externally accessible data connector and said disk drive controller when said second cable and second external device are connected to said externally accessible connector on said chassis.

2. The system of claim 1, wherein said port interface circuits are packaged separately from said CPU, within said system chassis.

3. The system of claim 1, wherein said first external input/output device is a standard device type which is normally used with said standard multi-pin connector format.

4. The system of claim 1, wherein said second external input/output device is not normally used with said standard multi-pin connector format.

5. The system of claim 1, further comprising multiple ones of said second input/output device, each said second input/output device is capable of removal from said second cable.

6. The system of claim 1, wherein said first input/output device is capable of removal from said first cable.

7. The system of claim 1, wherein said system chassis further includes:

a first memory storing configuration data regarding which of said first external input/output device or said second external input/output device is connected to said externally accessible data connector.

8. The system of claim 7, wherein said CPU includes means for checking the results of said means for querying said port interface circuits with said configuration data; and wherein said CPU includes means for updating said configuration data if the results of said means for querying do not match said configuration data.

9. The system of claim 8, wherein said system chassis further includes a second memory for storing data regarding possible ones of said second external input/output device;

wherein said means for updating said configuration data comprises retrieving a portion of data from said second memory regarding the correct type of said second external input/output device.

10. The system of claim 1, wherein said system chassis further comprises:

an internal floppy drive coupled to said disk drive controller.

11. The system of claim 10, wherein said CPU further includes means for remapping a logical drive designation from said internal floppy drive to said second external input/output device when said second external input/output device is connected to said externally accessible data connector.

12. A computer system, comprising:

a system unit including therein at least one central processing unit (CPU);

at least one externally accessible multi-pin data connector which conforms to a first mechanical and electrical specification;

port interface circuits connected to sense and to drive plural pins of said externally accessible data connector;

a disk drive controller coupled to plural pins of said externally accessible data connector; and multiplexing logic coupled to said externally accessible data connector, said port interface circuits, and said disk drive controller;

a first cable incorporating multiple data wires, and having a first multi-pin connector which matches said first mechanical and electrical specification;

a first external input/output device, which is physically separate from said system unit, and which is connected to said first cable to provide bidirectional data communication using a first protocol, through said first cable and said first connector thereof and said externally accessible connector on said system unit, to and from said port interface circuits;

a second cable incorporating multiple data wires such that each of said multiple data wires is connected to a respective pin of a second multi-pin connector, said second multi-pin connector substantially matching said first mechanical and electrical specification, said second connector including one or more pins carrying a voltage which is not compliant with said first mechanical and electrical specification;

a second external input/output device, which is physically separate from said system unit, and which is connected to each of said multiple data wires of said second cable to provide bidirectional data communication using a second protocol through said second cable and said second connector thereof and said externally accessible connector on said system unit, to and from said port interface circuits, said second external input/output device being a different device type than said first external input/output device; and wherein said CPU includes means for querying said port interface circuits to ascertain the voltage of said one or more pins of said externally accessible connector, such that said CPU automatically switches to said first protocol when said first cable and first external device are connected to said externally accessible connector on said system unit, and automatically switches to said second protocol when said second cable and second external device are connected to said externally accessible connector on said system unit wherein said multiplexing logic electrically connects said externally accessible data connector and said port interface circuits when said first cable and first external device are connected to said externally accessible connector on said chassis, and said multiplexing logic electrically connects said externally accessible data connector and said disk drive controller when said second cable and second external device are connected to said externally accessible connector.

13. The system of claim 12, wherein said system unit further includes:

a first memory storing configuration data regarding which of said first external input/output device or said second external input/output device is connected to said externally accessible data connector.

14. The system of claim 13, wherein said CPU includes means for checking the results of said means for querying said port interface circuits with said configuration data; and wherein said CPU includes means for updating said configuration data if the results of said means for querying do not match said configuration data.

15. The system of claim 14, wherein said system unit further includes a second memory for storing data regarding possible ones of said second external input/output device;

wherein said means for updating said configuration data comprises retrieving a portion of data from said second memory regarding the correct type of said second external input/output device.

16. The system of claim 12, wherein said system chassis further comprises:

an internal floppy drive coupled to said disk drive controller.

17. The system of claim 16, wherein said CPU further includes means for remapping a logical drive designation from said internal floppy drive to said second external input/output device when said second external input/output device is connected to said externally accessible data connector.

* * * * *